US012739811B2

(12) United States Patent
Jeon et al.

(10) Patent No.: US 12,739,811 B2
(45) Date of Patent: Sep. 15, 2026

(54) ELECTRONIC DEVICE AND METHOD FOR TRANSMITTING USER PLACE MESSAGE IN FRONTHAUL INTERFACE

(71) Applicant: Samsung Electronics Co., Ltd., Suwon-si (KR)

(72) Inventors: Namryul Jeon, Suwon-si (KR); Jaeyun Ko, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 534 days.

(21) Appl. No.: 18/191,548

(22) Filed: Mar. 28, 2023

(65) Prior Publication Data

US 2023/0403692 A1 Dec. 14, 2023

Related U.S. Application Data

(63) Continuation of application No. PCT/KR2023/003534, filed on Mar. 16, 2023.

(30) Foreign Application Priority Data

Jun. 8, 2022 (KR) ........................ 10-2022-0069820

(51) Int. Cl.
*H04W 72/044* (2023.01)
*H04W 92/12* (2009.01)

(52) U.S. Cl.
CPC .......... *H04W 72/046* (2013.01); *H04W 92/12* (2013.01)

(58) Field of Classification Search
None
See application file for complete search history.

(56) References Cited

U.S. PATENT DOCUMENTS 9,716,573 B2 7/2017 Liu et al.
11,044,589 B2 6/2021 Nguyen et al.
(Continued)

FOREIGN PATENT DOCUMENTS

CN 114556804 A 5/2022
JP 2022-504142 A 1/2022
(Continued)

OTHER PUBLICATIONS

O-RAN Working Group 4 (Open Fronthaul Interfaces WG) Control, User and Synchronization Plane Specification, O-RAN.WG4.CUS.0-v07.02, May 31, 2022.
(Continued)

*Primary Examiner* — Marcus Smith
*Assistant Examiner* — Rowan K Fakhro
(74) *Attorney, Agent, or Firm* — Jefferson IP Law, LLP

(57) ABSTRACT

A method performed by a distributed unit (DU) including transmitting a management message including information for indicating a representative extended antenna-carrier (eAxC) port to a radio unit (RU) through a fronthaul interface is provided. The method includes transmitting a control plane message including section information and section extension information for resource allocation to the RU through the fronthaul interface. The section extension information is used to combine a plurality of user plane (U-plane) messages into one U-plane message in the DU or the RU. The representative eAxC port of the fronthaul interface is used for transmitting or receiving of the combined one U-plane message.

16 Claims, 12 Drawing Sheets

(56) References Cited

U.S. PATENT DOCUMENTS 11,166,271 B2 11/2021 Jeon et al.
2021/0120531 A1 4/2021 Jeon et al.
2021/0385686 A1* 12/2021 Ahmed ................. H04W 28/06
2022/0014236 A1 1/2022 Kosugi et al.
2022/0014326 A1 1/2022 Lourdu Raja et al.
2022/0021435 A1* 1/2022 Österling ............. H04B 7/0695
2023/0216552 A1 7/2023 Jeon et al.
2023/0217422 A1* 7/2023 Sachidanand Sinha ..................... H04B 7/0617 370/280
2023/0231686 A1 7/2023 Jeon et al.
2023/0379106 A1 11/2023 Österling
2024/0023122 A1 1/2024 Jeon et al.
2024/0397456 A1* 11/2024 Hong .................. H04W 88/085
2024/0397486 A1* 11/2024 Zhao ................. H04L 27/26025
2024/0430892 A1* 12/2024 Amuru .................. H04W 28/02
2025/0330992 A1 10/2025 Jeon et al.

FOREIGN PATENT DOCUMENTS

KR 10-2021-0046486 A 4/2021
KR 10-2022-0037308 A 3/2022
KR 10-2022-0037326 A 3/2022
WO 2022/060186 A1 3/2022
WO 2022/060191 A1 3/2022

OTHER PUBLICATIONS

Keysight U5040A Open RAN Studio, 5G O-Ran Radio Unit (O-RU) Testing and Validation, User Guide, Jan. 31, 2022.
U.S. Lee et al., Technological Trends in Open 5G Fronthaul, Electronics and Telecommunications Trends, vol. 37, No. 3, pp. 1-10, Jun. 2, 2022.
O-RAN Fronthaul Working Group Control, User and Synchronization Plane Specification, O-RAN.WG4.CUS.0-v03.00, Apr. 2020.
International Search Report and Written Opinion dated Jun. 5, 2023, issued in International Application No. PCT/KR2023/003534.
Publicly Available Specification (PAS); O-Ran Fronthaul Control, User and Synchronization Plane Specification v07.02; (O-RAN-WG4.CUS.0-v07.02), ETSI TS 103 859 V7.0.2 (Sep. 2022), May 31, 2022.
O-RAN Working Group 4 (Open Fronthaul Interfaces WG) Control, User and Synchronization Plane Specification, O-RAN-WG4.CUS.0-v08.00, XP093292751, Apr. 4, 2022.
European Search Report dated Jul. 29, 2025, issued in European Patent Application No. 23819961.
Indian Office Action dated Jul. 24, 2026, issued in Indian Patent Application No. 202417090591.

* cited by examiner

900

| Section Type 1,3,5 : DL/UL control msgs | | | | | | | | | |
|---|---|---|---|---|---|---|---|---|---|
| 0 (msb) | 1 | 2 | 3 | 4 | 5 | 6 | 7 (1sb) | # of bytes | |
| ecpriVersion | | | | ecpriReserved | | | ecpriCon-catenation | 1 | |
| ecpriMessage | | | | | | | | 1 | |
| ecpriPayload | | | | | | | | 1 | |
| ecpriPayload | | | | | | | | 1 | |
| ecpriRtcid / ecpriPcid | | | | | | | | 1 | |
| ecpriRtcid / ecpriPcid | | | | | | | | 1 | |
| ecpriSeqid | | | | | | | | 1 | |
| ecpriSeqid | | | | | | | | 1 | |
| dataDirection | payloadVersion | | | filterIndex | | | | 1 | 910 |
| frameId | | | | | | | | 1 | |
| subrameId | | | | slotId | | | | 1 | |
| slotId | | symbolid | | | | | | 1 | |
| numberOfsections | | | | | | | | 1 | |
| sectionType = 1 | | | | | | | | 1 | |
| udCompHdr | | | | | | | | 1 | |
| reserved | | | | | | | | 1 | |
| sectionId | | | | | | | | 1 | 920 |
| sectionId | | | | rb | symInc | startPrbc | | 1 | |
| startPrbc | | | | | | | | 1 | |
| numPrbc | | | | | | | | 1 | |
| reMask[11:4] | | | | | | | | 1 | |
| reMask[3:0] | | | | numSymbol | | | | 1 | |
| ef = 1 | beamId[14:8] | | | | | | | 1 | |
| beamId[7:0] | | | | | | | | 1 | |
| ef = 1 | extType = 0x4A | | | | | | | 1 | 930 |
| extLen = 0x01 (1 words) | | | | | | | | 1 | |
| beamGroupType = 01b | | numPortc = 2 or 4 | | | | | | 1 | |
| reserved | | | | | | | | 1 | |

| Section Type 1,3,5 : DL/UL IQ data msgs | | | | | | | | |
|---|---|---|---|---|---|---|---|---|
| 0 (msb) | 1 | 2 | 3 | 4 | 5 | 6 | 7 (1sb) | # of bytes |
| ecpriVersion | | | | ecpriReserved | | | ecpriCon-catenation | 1 |
| ecpriMessage | | | | | | | | 1 |
| ecpriPayload | | | | | | | | 1 |
| ecpriPayload | | | | | | | | 1 |
| ecpriRtcid / ecpriPcid | | | | | | | | 1 |
| ecpriRtcid / ecpriPcid | | | | | | | | 1 |
| ecpriSeqid | | | | | | | | 1 |
| ecpriSeqid | | | | | | | | 1 |
| dataDirection | payloadVersion | | | filterIndex | | | | 1 |
| frameId | | | | | | | | 1 |
| subrameId | | | | slotId | | | | 1 |
| slotId | | symbolid | | | | | | 1 |
| sectionId | | | | | | | | 1 |
| sectionId | | | | rb | symInc | startPrbc | | 1 |
| startPrbc | | | | | | | | 1 |
| numPrbc | | | | | | | | 1 |
| udCompHdr (not always present) | | | | | | | | 0/1 |
| reserved (not always present) | | | | | | | | 0/1 |
| udCompLen (not always present) | | | | | | | | 0/2 |
| udCompParam (not always present) | | | | | | | | 0/1/2 |
| iSample (1st RE in the PRB for representative eAxC ID) | | | | | | | | 1 |
| qSample (1st RE in the PRB for representative eAxC ID) | | | | | | | | 1 |
| ... | | | | | | | | |
| iSample (12th RE in the PRB for representative eAxC ID) | | | | | | | | 1 |
| qSample (12th RE in the PRB for representative eAxC ID) | | | | | | | | 1 |
| udCompParam (not always present) | | | | | | | | 0/1/2 |
| iSample (1st RE in the PRB for member eAxC ID #1) | | | | | | | | 1 |
| qSample (1st RE in the PRB for member eAxC ID #1) | | | | | | | | 1 |
| ... | | | | | | | | |
| iSample (12th RE in the PRB for member eAxC ID #1) | | | | | | | | 1 |
| qSample (12th RE in the PRB for member eAxC ID #1) | | | | | | | | 1 |
| udCompParam (not always present) | | | | | | | | 0/1/2 |
| iSample (1st RE in the PRB for member eAxC ID #2) | | | | | | | | 1 |
| qSample (1st RE in the PRB for member eAxC ID #2) | | | | | | | | 1 |
| ... | | | | | | | | |
| iSample (12th RE in the PRB for member eAxC ID #2) | | | | | | | | 1 |
| qSample (12th RE in the PRB for member eAxC ID #2) | | | | | | | | 1 |
| udCompParam (not always present) | | | | | | | | 0/1/2 |
| iSample (1st RE in the PRB for member eAxC ID #3) | | | | | | | | 1 |
| qSample (1st RE in the PRB for member eAxC ID #3) | | | | | | | | 1 |
| ... | | | | | | | | |
| iSample (12th RE in the PRB for member eAxC ID #3) | | | | | | | | 1 |
| qSample (12th RE in the PRB for member eAxC ID #3) | | | | | | | | 1 |
| ... | | | | | | | | |

1010 (sectionId through udCompLen), 1020 (udCompParam through qSample 12th RE for representative eAxC ID), 1021 (member eAxC ID #1), 1022 (member eAxC ID #2), 1023 (member eAxC ID #3)

FIG. 10

ELECTRONIC DEVICE AND METHOD FOR TRANSMITTING USER PLACE MESSAGE IN FRONTHAUL INTERFACE

CROSS-REFERENCE TO RELATED APPLICATION(S)

This application is a continuation application, claiming priority under § 365 (c), of an International application No. PCT/KR2023/003534, filed on Mar. 16, 2023, which is based on and claims the benefit of a Korean patent application number 10-2022-0069820, filed on Jun. 8, 2022, in the Korean Intellectual Property Office, the disclosure of which is incorporated by reference herein in its entirety.

TECHNICAL FIELD

The disclosure relates to a fronthaul interface. More particularly, the disclosure relates to an electronic device and a method for transmitting a user plane (U-plane) message in a fronthaul interface.

BACKGROUND ART

As the transmission capacity in wireless communication systems increases, a function split that functionally separates a base station is being applied. According to such a function split, a base station may be divided into a distributed unit (DU) and a radio unit (RU). A front haul interface is defined for communications between the DU and the RU.

The above information is presented as background information only to assist with an understanding of the disclosure. No determination has been made, and no assertion is made, as to whether any of the above might be applicable as prior art with regard to the disclosure.

DISCLOSURE

Technical Solution

According to embodiments of the disclosure, a method performed by a distributed unit (DU) is provided. The method includes transmitting a management message including information for indicating a representative extended antenna-carrier (eAxC) port to a radio unit (RU) through a fronthaul interface. The method includes transmitting a control plane message including section information and section extension information for resource allocation to the RU through the fronthaul interface. The section extension information may be used to combine a plurality of user plane (U-plane) messages into one U-plane message in the DU or the RU. The representative eAxC port of the fronthaul interface may be used for transmitting or receiving of the combined one U-plane message.

According to embodiments of the disclosure, a method performed by a radio unit (RU) is provided. The method includes receiving a management message including information for indicating a representative extended antenna-carrier (eAxC) port from a distributed unit (DU) through a fronthaul interface. The method includes receiving a control plane (C-plane) message including section information and section extension information for resource allocation from the DU through the fronthaul interface. The section extension information may be used to combine a plurality of user plane (U-plane) messages into one U-plane message in the DU or the RU. The representative eAxC port of the fronthaul interface may be used for transmitting or receiving of the combined one U-plane message.

According to embodiments of the disclosure, an electronic device of a distributed unit (DU) is provided. The electronic device includes at least one transceiver and at least one processor coupled to the at least one transceiver. The at least one processor is configured to control the at least one transceiver to transmit a management message including information for indicating a representative extended antenna-carrier (eAxC) port to a radio unit (RU) through a fronthaul interface. The at least one processor is configured to control the at least one transceiver to transmit a control plane message including section information and section extension information for resource allocation to the RU through the fronthaul interface. The section extension information may be used to combine a plurality of user plane (U-plane) messages into one U-plane message in the DU or the RU. The representative eAxC port of the fronthaul interface may be used for transmitting or receiving of the combined one U-plane message.

According to embodiments of the disclosure, an electronic device of a radio unit (RU) includes at least one transceiver and at least one processor coupled to the at least one transceiver. The at least one processor is configured to control the at least one transceiver to receive a management message including information for indicating a representative extended antenna-carrier (eAxC) port from a distributed unit (DU) through a fronthaul interface. The at least one processor is configured to control the at least one transceiver to receive a control plane message including section information and section extension information for resource allocation from the DU through the fronthaul interface. The section extension information may be used to combine a plurality of user plane (U-plane) messages into one U-plane message in the DU or the RU. The representative eAxC port of the fronthaul interface may be used for transmitting or receiving of the combined one U-plane message.

DESCRIPTION OF DRAWINGS

The above and other aspects, features, and advantages of certain embodiments of the disclosure will be more apparent from the following description taken in conjunction with the accompanying drawings, in which:

FIG. 9 illustrates a control plane message for combining user plane messages according to an embodiment of the disclosure; and FIG. 10 illustrates a user plane message using a representative port according to an embodiment of the disclosure.

The same reference numerals are used to represent the same elements throughout the drawings.

MODE FOR INVENTION

Figure 1:
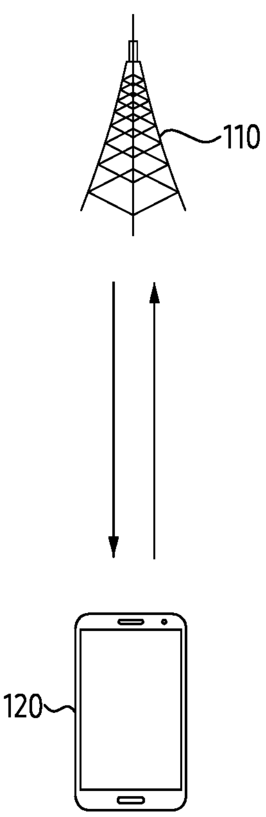
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

In various examples of the disclosure described below, a hardware approach will be described as an example. However, since various embodiments of the disclosure may include a technology that utilizes both the hardware-based and the software-based approaches, they are not intended to exclude the software-based approach.

As used herein, the terms referring to merging (e.g., merging, grouping, combination, aggregation, joint, integration, unifying), the terms referring to signals (e.g., packet, message, signal, information, signaling), the terms referring to resources (e.g. section, symbol, slot, subframe, radio frame, subcarrier, resource element (RE), resource block (RB), bandwidth part (BWP), opportunity, the terms used to refer to any operation state (e.g., step, operation, procedure), the terms referring to data (e.g. packet, message, user stream, information, bit, symbol, codeword), the terms referring to a channel, the terms referring to a network entity distributed unit (DU), radio unit (RU), central unit (CU), control plane (CU-CP), user plane (CU-UP), O-DU-open radio access network (O-RAN) DU), O-RU (O-RAN RU), O-CU (O-RAN CU), O-CU-UP (O-RAN CU-CP), O-CU-CP (O-RAN CU-CP)), the terms referring to the components of an apparatus or device, or the like are only illustrated for convenience of description in the disclosure. Therefore, the disclosure is not limited to those terms described below, and other terms having the same or equivalent technical meaning may be used therefor. Further, as used herein, the terms, such as ‘~module’, ‘~unit’, ‘~part’, ‘~body’, or the like may refer to at least one shape of structure or a unit for processing a certain function.

Further, throughout the disclosure, an expression, such as e.g., ‘above’ or ‘below’ may be used to determine whether a specific condition is satisfied or fulfilled, but it is merely of a description for expressing an example and is not intended to exclude the meaning of ‘more than or equal to’ or ‘less than or equal to’. A condition described as ‘more than or equal to’ may be replaced with an expression, such as ‘above’, a condition described as ‘less than or equal to’ may be replaced with an expression, such as ‘below’, and a condition described as ‘more than or equal to and below’ may be replaced with ‘above and less than or equal to’, respectively. Furthermore, hereinafter, ‘A’ to ‘B’ means at least one of the elements from A (including A) to B (including B). Hereinafter, ‘C’ and/or ‘D’ means including at least one of ‘C’ or ‘D’, that is, {‘C’, ‘D’, or ‘C’ and ‘D’}.

The disclosure describes various embodiments using terms used in some communication standards (e.g., 3rd Generation Partnership Project (3GPP), extensible radio access network (xRAN), open-radio access network (O-RAN) or the like), but it is only of an example for explanation, and the various embodiments of the disclosure may be easily modified even in other communication systems and applied thereto.

The disclosure is to provide an electronic device and a method for combining multiple user plane (U-plane) messages into one user plane on a fronthaul interface.

Further, the disclosure is to provide an apparatus and a method for transmitting one user plane message by merging a user plane data of layers on a fronthaul interface.

Still further, the disclosure is to provide an apparatus and a method for merging sections of different layers into one section on a fronthaul interface.

Still further, the disclosure is to provide an apparatus and a method for reducing the number of packets on a fronthaul interface between a distributed unit (DU) and a radio unit (RU).

The electronic device and the method according to embodiments of the disclosure makes it possible to reduce the operational burden of a distributed unit (DU) and a radio unit (RU), by transmitting one user plane message through a combination of user-plane (U-plane) messages.

The effects that can be obtained from the disclosure are not limited to those described above, and any other effects not mentioned herein will be clearly understood by those having ordinary skill in the art to which the disclosure belongs, from the following description.

FIG. 1 illustrates a wireless communication system according to an embodiment of the disclosure.

Referring to FIG. 1, it illustrates a base station 110 and a terminal 120 as parts of nodes using a wireless channel in a wireless communication system. Although FIG. 1 illustrates only one base station, the wireless communication system may further include another base station that is the same as or similar to the base station 110.

The base station 110 is a network infrastructure that provides wireless access to the terminal 120. The base station 110 may have a coverage defined based on a distance capable of transmitting a signal. In addition to the term ‘base station’, the base station 110 may be referred to as ‘access point (AP), ‘eNodeB (eNB)’, ‘5th generation node’, ‘next generation nodeB (gNB)’, ‘wireless point’, ‘transmission/reception’, or other terms having the same or equivalent meaning thereto.

The terminal 120, which is a device used by a user, performs communications with the base station 110 through a wireless channel. A link from the base station 110 to the terminal 120 is referred to as a downlink (DL), and a link from the terminal 120 to the base station 110 is referred to as an uplink (UL). Further, although not shown in FIG. 1, the terminal 120 and other terminals may perform communications with each other through the wireless channel. In this context, a link between the terminal 120 and another terminals (device-to-device link, D2D) is referred to as a side link, and the side link may be used mixed with a PC5 interface. In some other embodiments of the disclosure, the terminal 120 may be operated without any user's involvement. According to an embodiment of the disclosure, the terminal 120 is a device that performs machine-type communication (MTC) and may not be carried by a user. In addition, according to an embodiment of the disclosure, the terminal 120 may be a narrowband (NB)-Internet of things (IoT) device.

The terminal 120 may be referred to as 'user equipment (UE), 'customer premises equipment (CPE), 'mobile station', 'subscriber station', 'remote terminal', 'wireless terminal', 'electronic device', 'user device', or any other term having the same or equivalent technical meaning thereto.

The base station 110 may perform beamforming with the terminal 120. The base station 110 and the terminal 120 may transmit and receive radio signals in a relatively low frequency band (e.g., FR 1 (frequency range 1) of NR). Further, the base station 110 and the terminal 120 may transmit and receive radio signals in a relatively high frequency band (e.g., FR 2 of NR (or FR 2-1, FR 2-2, FR 2-3), FR 3, or millimeter wave (mmWave) bands (e.g., 28 GHz, 30 GHz, 38 GHz, 60 GHz)). In order to improve the channel gain, the base station 110 and the terminal 120 may perform beamforming. In this context, the beamforming may include transmission beamforming and reception beamforming. The base station 110 and the terminal 120 may assign directionality to a transmission signal or a reception signal. To that end, the base station 110 and the terminal 120 may select serving beams through a beam search or beam management procedure. After the serving beams are selected, subsequent communication may be performed through a resource having a QCL relationship with a resource that has transmitted the serving beams.

A first antenna port and a second antenna port may be evaluated to be in such a QCL relationship, if the wide-scale characteristics of a channel carrying symbols on the first antenna port can be estimated from a channel carrying symbols on the second antenna port. For example, the wide-scale characteristics may include at least one of delay spread, Doppler spread, Doppler shift, average gain, average delay, and spatial receiver parameters.

Although in FIG. 1, both the base station 110 and the terminal 120 are described as performing beamforming, embodiments of the disclosure are not necessarily limited thereto. In some embodiments of the disclosure, the terminal may or may not perform beamforming. Likewise, the base station may or may not perform beamforming. That is to say, only either one of the base station and the terminal may perform beamforming, or both the base station and the terminal may not perform beamforming.

In the disclosure, a beam means a spatial flow of a signal in a radio channel, and may be formed by one or more antennas (or antenna elements), of which formation process may be referred to as beamforming. The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an IE, such as a CSI-RS resource, an SRS-resource, or the like may be used, and the configuration may include information associated with a beam. Beam-associated information may refer to whether a corresponding configuration (e.g., CSI-RS resource) uses the same spatial domain filter as other configuration (e.g., another CSI-RS resource within the same CSI-RS resource set) or uses a different spatial domain filter, or with which reference signal is quasi-co-located (QCL), or if QCLed, what type (e.g., QCL type A, B, C, or D) it has.

According to the related art, in a communication system with a relatively large cell radius of a base station, each base station was installed so that the respective base station includes functions of a digital processing unit (or distributed unit (DU)) and a radio frequency (RF) processing unit (or radio unit (RU)). However, as high-frequency bands are used in 4th generation (4G) systems and/or its subsequent communication systems (e.g., fifth-generation (5G), and the cell coverage of a base station decreased, the number of base stations to cover a certain area has increased. Thus, it led to more increased burden of initial installation costs for communication providers to install more base stations. In order to minimize the installation costs of the base station, a structure has been proposed in which the DU and the RU of the base station are separated so that one or more RUs are connected to one DU through a wired network and one or more RUs geographically distributed are arranged to cover a specific area. Hereinafter, deployment structures and extension examples of base stations according to various embodiments of the disclosure will be described with reference to FIGS. 2A and 2B.

Figure 2A:
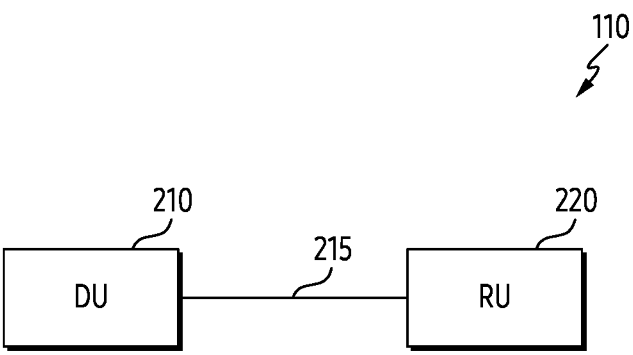
FIG. 2A illustrates a fronthaul interface according to an embodiment of the disclosure.

FIG. 2A illustrates a fronthaul interface according to an embodiment of the disclosure.

A fronthaul refers to entities between a wireless LAN and a base station, as opposed to a backhaul between a base station and a core network.

Although FIG. 2A illustrate an example of a fronthaul structure between the DU 210 and one RU 220, it is only for convenience of description and the disclosure is not limited thereto. In other words, an embodiment of the disclosure may also be applied to a fronthaul structure between one DU and a plurality of RUs. For example, an embodiment of the disclosure may be applied to a fronthaul structure between one DU and two RUs. Further, an embodiment of the disclosure may be also applied to a fronthaul structure between one DU and three RUs.

Referring to FIG. 2A, the base station 110 may include a DU 210 and an RU 220. The fronthaul 215 between the DU 210 and the RU 220 may be operated through an $F_x$ interface. For the operation of the fronthaul 215, an interface, such as e.g., an enhanced common public radio interface (eCPRI) or a radio over ethernet (ROE) may be used.

Along with development of communication technology, the mobile data traffic has increased a great deal, and thus, the bandwidth requirement demanded by the fronthaul between the digital unit (DU) and the radio unit (RU) has increased significantly. In a deployment, such as a centralized/cloud radio access network (C-RAN), the DU may be implemented to perform the functions for packet data convergence protocol (PDCP), radio link control (RLC), media access control (MAC), and physical (PHY), and the RU may be implemented to further perform the functions for a PHY layer in addition to the radio frequency (RF) function.

The DU 210 may serve as an upper layer of a wireless network. For example, the DU 210 may perform a function of a MAC layer and a part of the PHY layer. Here, the part of the PHY layer is performed at a higher level amongst the functions of the PHY layer, and may include, for example, channel encoding (or channel decoding), scrambling (or descrambling), modulation (or demodulation), or layer mapping (or layer de-mapping). According to an embodiment of the disclosure, when the DU 210 conforms to the O-RAN standard, it may be referred to as an O-DU (O-RAN DU). The DU 210 may be represented replaced by a first network entity for a base station (e.g., gNB) in embodiments of the disclosure, as occasion demands.

The RU 220 may be responsible for lower layer functions of the wireless network. For example, the RU 220 may perform a part of the PHY layer and the RF function. Here, the part of the PHY layer is performed at a relatively lower level than the DU 210 amongst functions of the PHY layer, and may include, for example, iFFT transform (or FFT transform), CP insertion (CP removal), and digital beamforming. Examples of such specific function split are described in further detail with reference to FIG. 4. The RU 220 may be referred to as 'access unit (AU)', 'access point (AP)', 'transmission/reception point (TRP)', 'remote radio head (RRH)', 'radio unit (RU)', or any other terms having an equivalent technical meaning thereto. According to an embodiment of the disclosure, when the RU 220 conforms to the O-RAN standard, it may be referred to as an O-RU (O-RAN RU). The RU 220 may be represented replaced by a second network entity for a base station (e.g., gNB) in embodiments of the disclosure, as circumstance demands.

Although FIG. 2A describes that the base station 110 includes the DU 210 and the RU 220, the embodiments of the disclosure are not limited thereto. The base station according to embodiments of the disclosure may be implemented with a distributed deployment according to a centralized unit (CU) configured to perform a function of upper layers (e.g., packet data convergence protocol (PDCP), radio resource control (RRC)) of an access network, and a distributed unit (DU) configured to perform a function of a lower layer. In this occasion, the distributed unit (DU) may include a digital unit (DU) and a radio unit (RU) of FIG. 1. Between the core (e.g., 5G core (5GC) or next generation core (NGC)) network and the radio network (RAN), the deployment of the base station may be implemented in the order of CU, DU, and RU. The interface between the CU and the distributed unit (DU) may be referred to as an F1 interface.

The centralized unit (CU) may be connected to one or more DUs to act as a higher layer than the DU. For example, the CU may be responsible for the functions of radio resource control (RRC) and packet data convergence protocol (PDCP) layers, and the DU and the RU may be responsible for the functions of lower layers. The DU may perform some functions (high PHY) of the radio link control (RLC), the media access control (MAC), and the physical (PHY) layers, and the RU may be responsible for the remaining functions (low PHY) of the PHY layer. Further, as an example, the digital unit (DU) may be included in the distributed unit (DU) according to implementation of a distributed arrangement of the base station. Hereinafter, unless otherwise defined, the operations of the digital unit (DU) and the RU will be described, but it is to be noted that various embodiments of the disclosure may be applied to both a base station deployment including the CU or a deployment in which the DU is directly connected to a core network, that is, being incorporated into a base station (e.g., an NG-RAN node) where the CU and the DU are one entity.

Figure 2B:
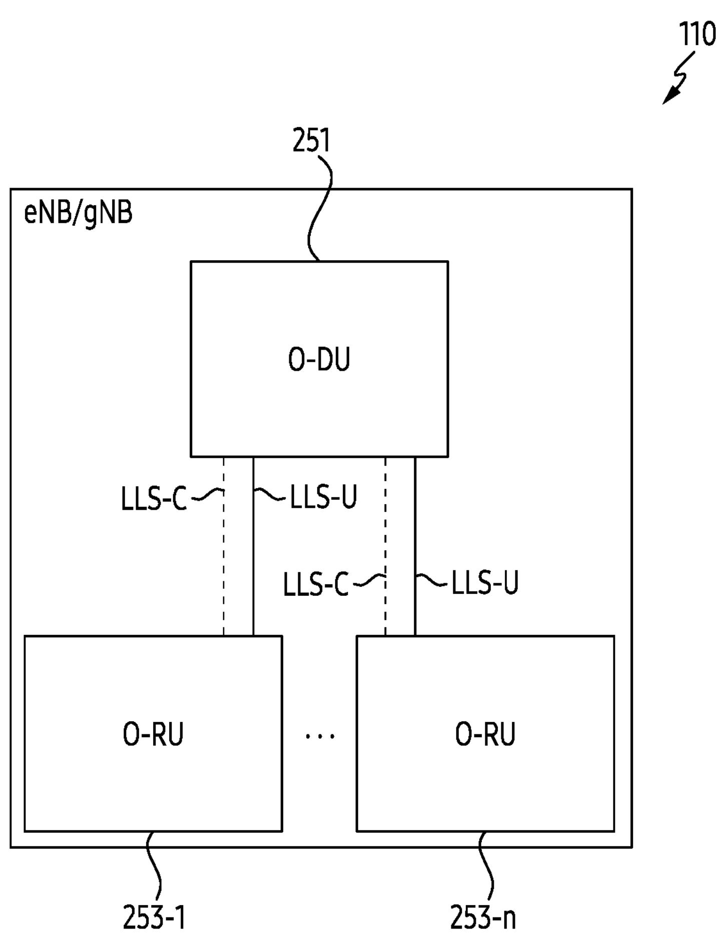
FIG. 2B illustrates a fronthaul interface of an open radio access network (O-RAN) according to an embodiment of the disclosure.

FIG. 2B illustrates a fronthaul interface of an O (open)-RAN (radio access network) according to an embodiment of the disclosure.

An eNB or a gNB is illustrated as a base station 110 according to distributed deployment.

Referring to FIG. 2B, the base station 110 may include an O-DU 251 and O-RUs (253-1, . . . , **253-*n*). Hereinafter, for convenience of explanation, the operation and function of the O-RU 253-1 may be understood with an explanation for each of other O-RUs (e.g., O-RU 253-*n***).

The DU 251 is a logical node including functions except those exclusively assigned to O-RU 253-1 amongst the functions of the base station (e.g., eNB, gNB) according to FIG. 4 to be described later. The O-DU 251 may control the operation of the O-RUs (253-1, . . . , **253-*n*). The O-DU 251 may be referred to as a lower layer split (LLS) central unit (CU). The O-RU 253-1 is a logical node including a subset amongst the functions of a base station (e.g., eNB, gNB) according to FIG. 4 to be described later. A real-time aspect of control plane (C-plane) communication and user plane (U-plane) communication with the O-RU 253-1 may be controlled by the O-DU 251**.

The DU 251 may perform communication with the O-RU 253-1 through an LLS interface. The LLS interface corresponds to the fronthaul interface. The LLS interface means a logical interface between the O-DU 251 and the O-RU 253-1, using a lower layer function split (i.e., intra-PHY-based function split). The LLS-C between the O-DU 251 and the O-RU 253-1 provides a C-plane through the LLS interface. The LLS-U between the O-DU 251 and the O-RU 253-1 provides a U-plane through the LLS interface.

In FIG. 2B, the entities of the base station 110 are described by referring to O-DU and O-RU to explain the O-RAN. However, such designation should not be construed as limiting the embodiments of the disclosure thereto. In the embodiments described with reference to FIGS. 3A, 3B and 4 to 10, the operations of the DU 210 may be performed by the O-DU 251, of course. The description of the DU 210 may be also applied to the O-DU 251. Similarly, in the embodiments described with reference to FIGS. 3A, 3B and 4 to 10, the operations of the RU 220 may be performed by the O-RU 253-1, of course. The description of the RU 220 may be also applied to the O-DU 253-1.

Figure 3A:
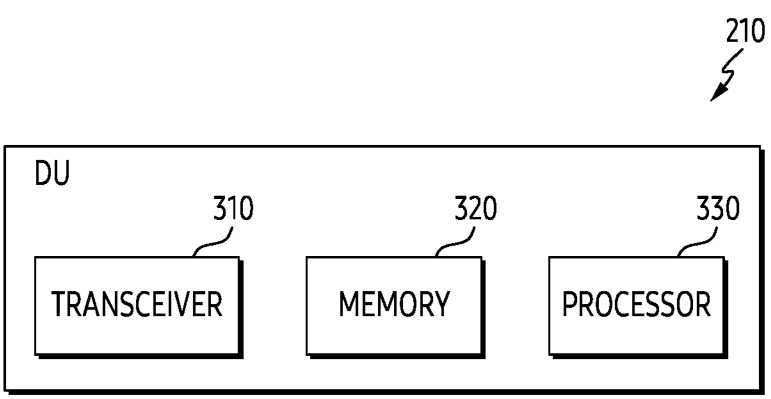
FIG. 3A illustrates a functional configuration of a distributed unit (DU) according to an embodiment of the disclosure.

FIG. 3A illustrates a functional configuration of a distributed unit (DU) according to an embodiment of the disclosure.

The configuration illustrated in FIG. 3A may be understood as a configuration of the DU 210 of FIG. 2A (or O-DU 251 of FIG. 2B) as a part of the base station. As used herein, the terms '~module', '~unit', or '~part' mean a unit for processing at least one function or operation, which may be implemented by hardware, software, or a combination of hardware and software.

Referring to FIG. 3A, the DU 210 includes a transceiver 310, a memory 320, and a processor 330.

The transceiver 310 may perform functions for transmitting and/or receiving signals in a wired communication environment. The transceiver 310 may include a wired interface for controlling a direct connection between a device and another device through a transmission medium (e.g., copper wire, optical fiber, etc.). For example, the transceiver 310 may transmit an electrical signal to other device through a copper wire or perform a conversion between an electrical signal and an optical signal. The DU 210 may communicate with a radio unit (RU) via the transceiver 310. The DU 210 may be connected to a core network or a distributed CU via transceiver 310.

The transceiver 310 may perform the functions for transmitting and receiving signals in a wireless communication environment. For example, the transceiver 310 may perform a function for conversion between a baseband signal and a bit string according to a physical layer standard of a system. For example, upon data transmission, the transceiver 310 generates complex symbols by encoding and modulating a transmit bit string. Further, upon data reception, the transceiver 310 restores the received bit string through demodulation and decoding of the baseband signal. Further, the transceiver 310 may include a plurality of transmission/reception paths. Furthermore, according to an embodiment of the disclosure, the transceiver 310 may be connected to a core network or connected to other nodes (e.g., integrated access backhaul (IAB).

The transceiver 310 is configured to transmit and receive signals. For example, the transceiver 310 may transmit a management plane (M-plane) message. For example, the transceiver 310 may transmit a synchronization plane (S-plane) message. For example, the transceiver 310 may transmit a control plane (C-plane) message. For example, the transceiver 310 may transmit a user plane (U-plane) message. For example, the transceiver 310 may receive the user plane message. Although only the transceiver 310 is illustrated in FIG. 3A, the DU 210 may include two or more transceivers, according to another embodiment.

The transceiver 310 transmits and receives signals as described above. Accordingly, all or at least part of the transceiver 310 may be also referred to as a communication unit, a transmission unit, a reception unit, or a transmission/reception unit. Further, throughout the description, it is to be noted that transmission and reception performed via a wireless channel are intended to include the aforementioned processing performed by the transceiver 310.

Although not shown in FIG. 3A, the transceiver 310 may further include a backhaul transceiver for connection with a core network or another base station. The backhaul transceiver provides an interface for performing communication with other nodes in the network. In other words, the backhaul transceiver converts a bit string transmitted from a base station to another node, for example, another access node, another base station, a higher node, a core network or the like, into a physical signal and converts the physical signal received from the other node into a bit string.

The memory 320 stores data, such as a basic program, an application program, and setting information for an overall operation of the DU 210. The memory 320 may be referred to as a storage unit. The memory 320 may be configured of a volatile memory, a nonvolatile memory, or a combination of a volatile memory and a nonvolatile memory. Further, the memory 320 provides stored data according to a request of the processor 330.

The processor 330 controls the overall operations of the DU 210. The processor 380 may be referred to as a controller. For example, the processor 330 transmits and receives signals through the transceiver 310 (or via a backhaul communication unit). Further, the processor 330 records and reads data into/from the memory 320. Further, the processor 330 may perform functions of a protocol stack required by the communication standard. Although only the processor 330 is illustrated in FIG. 3A, the DU 210 may include two or more processors, according to an example of another implementation.

The configuration of the DU 210 illustrated in FIG. 3A is only of an example, and a configuration of the DU performing the embodiments of the disclosure is not limited to the configuration illustrated in FIG. 3A. In some embodiments of the disclosure, some of the configuration may be added, deleted, or changed.

Figure 3B:
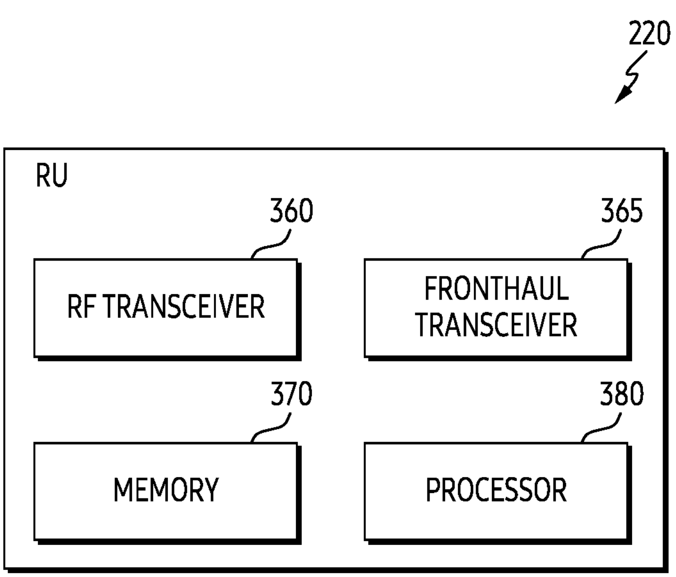
FIG. 3B illustrates a functional configuration of a radio unit (RU) according to an embodiment of the disclosure.

FIG. 3B illustrates a functional configuration of a radio unit (RU) according to an embodiment of the disclosure.

The configuration illustrated in FIG. 3B may be understood as a configuration of the RU 220 of FIG. 2B or the O-RU 253-1 of FIG. 2B, as a part of the base station. As used herein, the terms, such as '~module', '~unit', or '~part' mean a unit for processing at least one function or operation, which may be implemented by hardware, software, or a combination of hardware and software.

Referring to FIG. 3B, the RU 220 includes an RF transceiver 360, a fronthaul transceiver 365, a memory 370, and a processor 380.

The RF transceiver 360 performs the functions for transmitting and receiving signals through a wireless channel. For example, the RF transceiver 360 up-converts a baseband signal into an RF band signal to transmit the RF band signal through an antenna, and down-converts the RF band signal received through the antenna into the baseband signal. For example, the RF transceiver 360 may include a transmission filter, a reception filter, an amplifier, a mixer, an oscillator, a DAC, an ADC, or the like.

The RF transceiver 360 may include a plurality of transmission/reception paths. Furthermore, the RF transceiver 360 may include an antenna unit. The RF transceiver 360 may include at least one antenna array configured with a plurality of antenna elements. In terms of hardware, the RF transceiver 360 may be configured with a digital circuit and an analog circuit (e.g., radio frequency integrated circuit (RFIC)). Here, the digital circuit and the analog circuit may be implemented in a single package. Further, the RF transceiver 360 may include a plurality of RF chains. The RF transceiver 360 may perform beamforming. The RF transceiver 360 may apply a beamforming weight to a signal to be transmitted/received for assigning directionality according to the setting of the processor 380. According to an embodiment of the disclosure, the RF transceiver 360 may include a radio frequency (RF) block (or an RF part).

According to an embodiment of the disclosure, the RF transceiver 360 may transmit and receive the signal over a radio access network. For example, the RF transceiver 360 may transmit a downlink signal. The downlink signal may include a synchronization signal (SS), a reference signal (RS) (e.g., cell-specific reference signal (CRS), DM (demodulation)-RS), system information (e.g., MIB, SIB, RMSI (remaining system information), OSI (other information), configuration messages, control information, or downlink data. Further, for example, the RF transceiver 360 may receive an uplink signal. The uplink signal may include a random access related signal (e.g., random access preamble (RAP) (or Msg1 (message 1), Msg3 (message 3)), a reference signal (e.g., sounding reference signal (SRS), DM-RS), a power headroom report (PHR) or the like. Although only the RF transceiver 360 is illustrated in FIG. 3B, the RU 220 may include two or more RF transceivers, according to another implementation example.

According to embodiments of the disclosure, the RF transceiver 460 may transmit RIM-RS. The RF transceiver 460 may transmit a first type of RIM-RS (e.g., RIM-RS type 1 of 3GPP) for notifying detection of far-field interference. The RF transceiver 460 may transmit a second type of RIM-RS (e.g., RIM-RS type 2 of 3GPP) for notifying presence or absence of the far-field interference.

The fronthaul transceiver 365 may transmit and receive a signal. According to an embodiment of the disclosure, the fronthaul transceiver 365 may transmit and receive the signal on a fronthaul interface. For example, the fronthaul transceiver 365 may receive a management plane (M-plane) message. For example, the fronthaul transceiver 365 may receive a synchronization plane (S-plane) message. For example, the fronthaul transceiver 365 may receive a control plane (C-plane) message. For example, the fronthaul transceiver 365 may transmit a user plane (U-plane) message. For example, the fronthaul transceiver 365 may receive the user plane message. Although only the fronthaul transceiver 365 is illustrated in FIG. 3B, the RU 220 may include two or more fronthaul transceivers, according to another implementation example.

The RF transceiver 360 and the fronthaul transceiver 365 transmit and receive signals as described above. As such, all or at least part of the RF transceiver 360 and the fronthaul transceiver 365 may be referred to as a communication unit, a transmission unit, a reception unit, or a transmission/reception unit. Further, throughout the following disclosure, transmission and reception performed through a radio channel are used to mean that the aforementioned processing is performed by the RF transceiver 360.

The memory 370 stores data, such as a basic program, an application program, and setting information for an overall operation of the RU 220. The memory 370 may be referred to as a storage unit. The memory 370 may be configured with a volatile memory, a nonvolatile memory, or a combination of a volatile memory and a nonvolatile memory. Further, the memory 370 provides stored data according to a request of the processor 380. According to an embodiment of the disclosure, the memory 370 may include a memory for storing conditions, instructions, or set values related to the SRS transmission scheme.

The processor 380 controls the overall operations of the RU 220. The processor 380 may be referred to as a controller. For example, the processor 380 transmits and receives signals through the RF transceiver 360 or the fronthaul transceiver 365. Further, the processor 380 writes and reads data into/from the memory 370. Then, the processor 380 may perform the functions of the protocol stack required by the communication standard. Although only the processor 380 is illustrated in FIG. 3B, the RU 220 may include two or more processors, according to another implementation example. The processor 380 may include a storage space for storing instructions/codes that are at least temporarily residing in the processor 380, as the instructions/codes being an instruction set or code stored in the memory 370. The processor 380 may further include various communication modules for performing communication. The processor 380 may control the RU 220 to perform operations according to the following embodiments of the disclosure.

The configuration of the RU (220) illustrated in FIG. 3B is only of an example, and the example of the RU performing the embodiments of the disclosure is not limited to the configuration illustrated in FIG. 3B. In some configurations, some of the configuration may be added, deleted, or changed.

Figure 4:
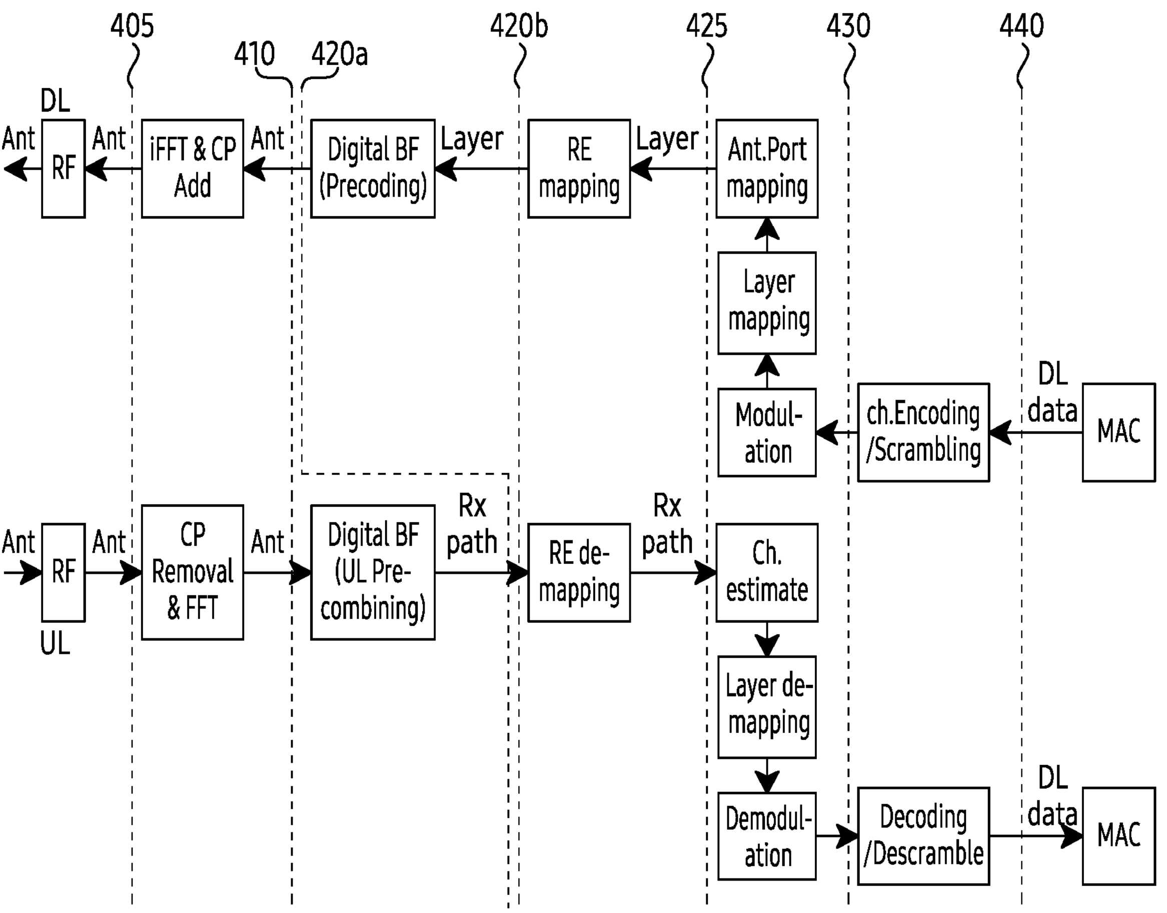
FIG. 4 illustrates a function split in between a DU and an RU according to an embodiment of the disclosure.

FIG. 4 illustrates a function split between a DU and an RU according to an embodiment of the disclosure.

Along with further advances in wireless communication technology (e.g., with the introduction of 5G communication systems (or NR (new radio) communication systems), the frequency band being used has increased even more. As the cell radius of base stations becomes very small, the number of RUs required to be installed has further increased. Furthermore, in the 5G communication system, the amount of data transmission has greatly increased by 10 times or more, and thus, the transmission capacity of the wired network for transmission to the fronthaul has also significantly increased. Therefore, due to the above-described factors, the installation costs for the wired network in the 5G communication system may increase very significantly. As such, in order to reduce the transmission capacity of the wired network as well as reduce the installation costs for the wired network, such a 'function split' may be used to reduce the transmission capacity of the fronthaul by transferring some functions of the modem of the DU to the RU.

To reduce the burden on the DU, the role of the RU, which is only responsible for the existing RF functions, can be extended to some function of the physical layer. As the RU performs functions of a higher layer, the throughput of the RU increases, thereby leading to increased transmission bandwidth at the fronthaul, and at the same time, lowering the latency requirement constraints due to response processing. Meanwhile, as the RU performs the functions of the higher layer, the virtualization gain decreases and the size, weight, and cost of the RU increase. Therefore, it is required to implement optimal function split based on the trade-off of the above-described advantages and disadvantages.

Referring to FIG. 4, the function split s in the physical layer below the MAC layer are illustrated. In the case of a downlink (DL) that transmits a signal to a terminal over a wireless network, a base station may sequentially perform channel encoding/scrambling, modulation, layer mapping, antenna mapping, RE mapping, digital beamforming (e.g., precoding), iFFT transformation/CP insertion, and RF conversion. In the case of uplink (UL) that receives a signal from a terminal over a wireless network, a base station may sequentially perform RF conversion, FFT transformation/CP removal, digital beamforming (e.g., pre-combining), RE de-mapping, channel estimation, layer de-mapping, demodulation, decoding/de-scrambling. Separation of uplink functions and downlink functions may be defined in various types according to the needs between the vendors, discussion on the standards, and the like, according to the aforementioned trade-off.

In a first function split 405, the RU performs the RF function and the DU performs the PHY function. In the first function split, the PHY function in the RU is not substantially implemented, and it may be referred to as Option 8, for example. In a second function split 410, the RU performs iFFT transformation/CP insertion in the DL of the PHY function and FFT transformation/CP removal in the UL, and the DU performs the remaining PHY functions. For example, the second function split 410 may be referred to as Option 7-1. In the third function split 420*a*, the RU performs iFFT transformation/CP insertion in the DL of the PHY function and FFT transformation/CP removal in the UL, and the DU performs the remaining PHY functions. For example, a third function split 420*a* may be referred to as Option 7-2x Category A. In a fourth function split 420*b*, the RU performs digital beamforming in both DL and UL, and the DU performs upper PHY functions after the digital beamforming. For example, the fourth function split 420*b* may be referred to as Option 7-2x Category B. In a fifth function split 425, the RU performs RE mapping (or RE de-mapping) in both DL and UL, and the DU performs the upper PHY functions after the RE mapping (or RE de-mapping). For example, the fifth function split 425 may be referred to as Option 7-2. In a sixth function split 430, the RU performs up to modulation (or demodulation) in both DL and UL, and the DU performs the upper PHY functions subsequent to the modulation (or demodulation). For example, the sixth function split 430 may be referred to as Option 7-3. In a seventh function split 440, the RU performs up to encoding/scrambling (or decoding/de-scrambling) in both DL and UL, and the DU performs the higher PHY functions subsequent to the modulation (or demodulation). For example, the seventh function split 440 may be referred to as Option 6.

According to an embodiment of the disclosure, when a large amount of signal processing is expected, such as FR 1 MMU, the function split (e.g., fourth function split 420*b*) at a relatively higher layer may be required to reduce the fronthaul capacity. Further, the function split at a too high layer (e.g., sixth function split 430) may lead to more complicated control interface and cause great burden on the implementation of the RU due to inclusion of multiple PHY processing blocks in the RU, and thus, an appropriate function split may be required depending on the deployment and the implementation scheme of the DU and RU.

According to an embodiment of the disclosure, in case where it is not possible to process the precoding of data received from the DU (i.e., when the precoding capability of the RU is limited), the third function split 420*a* or its lower function split (e.g., such as the second function split 410) may be applied. To the contrary, when it is capable of processing the precoding of data received from the DU, the fourth function split 420*b* or its higher function split (e.g., such as the sixth function split 430) may be applied.

Hereinafter, in the disclosure, the embodiments are described based on the third function split 420*a* (referred to as category A or CAT-A) or the fourth function split 420*b* (referred to as category B or CAT-B), for performing beamforming process in the RU, unless otherwise limited. The O-RAN specification distinguishes the type of O-RU, depending on whether the precoding function is located either on an O-DU interface or on an O-RU interface. An O-RU (i.e., with low complexity) in which no precoding is performed may be referred to as a CAT-A O-RU. The O-RU in which the precoding is performed may be referred to as a CAT-B O-RU.

Hereinafter, the upper PHY may refer to a physical layer processing carried out in the DU of the fronthaul interface. For example, the upper PHY may include FEC encoding/decoding, scrambling, and modulation/demodulation. Hereinafter, the lower PHY may refer to a physical layer processing carried out in the RU of the fronthaul interface. For example, a sub-PHY may include FFT/iFFT, digital beamforming, or physical random access channel (PRACH) extraction and filtering. However, the aforementioned criteria do not exclude the embodiments implemented through other function splits. The functional configuration, signaling, or operation of FIGS. 5 to 10 to be described below may be applied to not only the third function split 420*a* or the fourth function split 420*b* but also to other function splits.

Embodiments of the disclosure illustrate the specifications of eCPRI and O-RAN as a fronthaul interface, when transmitting a message between the DU (e.g., DU 210 in FIG. 2A) and the RU (e.g., RU 220 in FIG. 2A). The Ethernet payload of the message may include an eCPRI header, an O-RAN header, and additional fields. Hereinafter, various embodiments of the disclosure will be described using the standard terms of eCPRI or O-RAN, but other expressions having the same or equivalent meaning to each term thereof may be used in place of the various embodiments of the disclosure.

For the transport protocol of the fronthaul, Ethernet and eCPRI may be used, which are easy to share with the network. An eCPRI header and an O-RAN header may be included in the Ethernet payload. The eCPRI header may be located at the front-end of the Ethernet payload. The contents of the eCPRI header are as follows.

ecpriVersion (4 bits): This parameter indicates an eCPRI protocol version.

ecpriReserved (3 bits): This parameter is reserved for further use of eCPRI.

ecpriConcation (1 bit): This parameter indicates when eCPRI concatenation is in use.

ecpriMessage (1 byte): This parameter indicates a type of service carried by a message type. For example, the parameter indicates an IQ data message, a real-time control data message, or a transmission network delay measurement message.

ecpriPayload (2 bytes): This parameter indicates a byte size of a payload portion of the eCPRI message.

ecpriRtcid/ecpriPcid (2 bytes): This parameter is an eAxC (extended antenna-carrier) identifier (eAxC ID), identifying specific data flow related to each C-plane (ecpriRtcid) or U-plane (ecpriPcid) message.

ecpriSeqid (2 bytes): This parameter provides unique message identification and order at two levels. A first octet of this parameter is a sequence ID used to identify the order of messages within eAxC message stream, and the sequence ID is used to verify that all the messages have been received and to rearrange out-of-order messages. A second octet of this parameter is a sub-sequence ID. The sub-sequence ID is used to verify the order and implement rearrangement when radio-transport-level fragmentation (eCPRI or IEEE-1914.3) occurs.

An eAxC identifier (ID) includes a band and sector identifier ('BandSector_ID'), a component carrier identifier ('CC_ID'), a spatial stream identifier ('RU_Port_ID'), and a distributed unit identifier ('DU_Port_ID'). Bit allocation of the eAxC ID may be classified as follows.

DU_port ID: This ID is used to distinguish processing units in O-DU (e.g., other baseband cards). It is expected that the O-DU will allocate bits for the DU_port ID and the O-RU will attach the same value to the UL U-plane message to carry the same sectionId data.

BandSector_ID: This ID is an aggregated cell identifier (band and sector classification supported by O-RU).

CC_ID: This ID distinguishes carrier components supported by O-RU.

RU_port ID: This ID specifies logical flows, such as data layers or spatial streams, and logical flows, such as signal channels requiring special antenna assignment, such as separate numerologies (e.g., PRACH) or SRS.

The application protocol of the fronthaul may include a control plane (C-plane), a user plane (U-plane), a synchronization plane (S-plane), and a management plane (M-plane).

The control plane may be configured to provide scheduling information and beamforming information through a control message. The control plane means real-time control between the DU and the RU. The user plane may include IQ sample data transmitted between the DU and the RU. The user plane may include downlink data (IQ data or SSB/RS), uplink data (IQ data or SRS/RS), or PRACH data of the user. The weight vector of the aforementioned beamforming information may be multiplied by the user's data. The synchronization plane generally means traffic between the DU and the RU to a synchronization controller (e.g., IEEE grandmaster). The synchronization plane may be related to timing and synchronization. The management plane means non-real-time control between the DU and the RU. The management plane may be related to an initial setup, a non-real-time reset, or a reset, or a non-real-time report.

A message of the control plane, that is, a C-plane message may be encapsulated based on a two-layer header approaching scheme. The first layer may consist of an eCPRI common header or an IEEE 1914.3 common header, including fields used to indicate the message type. The second layer is an application layer including fields necessary for control and synchronization. A section in the application layer defines the characteristics of U-plane data transmitted or received in a beam with one pattern ID. The section types supported in the C-plane are as follows.

The section type may indicate the use of the control message transmitted in the control plane. For example, section type specific uses are as follows.

sectionType=0: This is used to indicate resource blocks or symbols that are not used in DL or UL.

sectionType=1: This is used for most DL/UL radio channels. Here, the term 'most' refers to channels that do not require a time or frequency offset, as in those required for mixed neuronal channels.

sectionType=2: This is reserved for further use.

sectionType=3: PRACH and mixed-numerology channel. Channels requiring a time or frequency offset or different from the nominal SCS value(s).

sectionType=4: This is reserved for further use.

sectionType=5: UE scheduling information, delivering UE scheduling information so that the RU can perform real-time BF weight calculation (O-RAN optional BF scheme).

sectionType=6: UE-specific channel information transmission, periodically delivering UE channel information so that the RU can perform real-time BF weight calculation (O-RAN optional BF scheme).

sectionType=7: This is used to support LAA sectionType=8: This is used for ACK/NACK Feedback.

Figure 5:
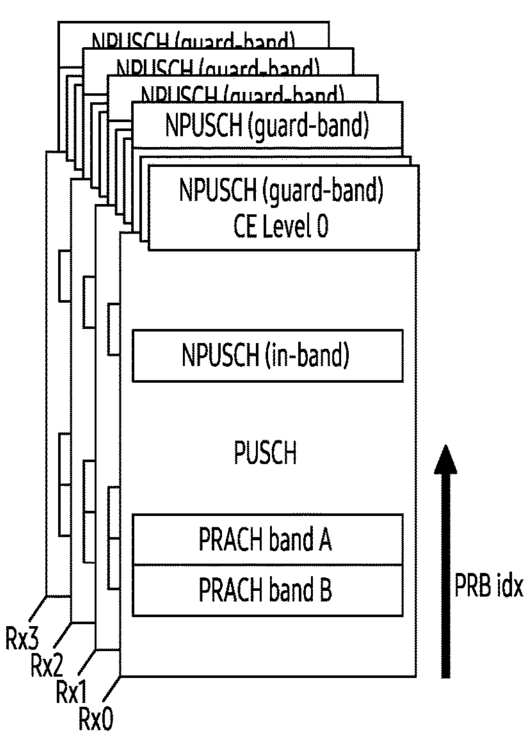
FIG. 5 illustrates user plane (U-plane) messages according to an embodiment of the disclosure.
Figure 5:
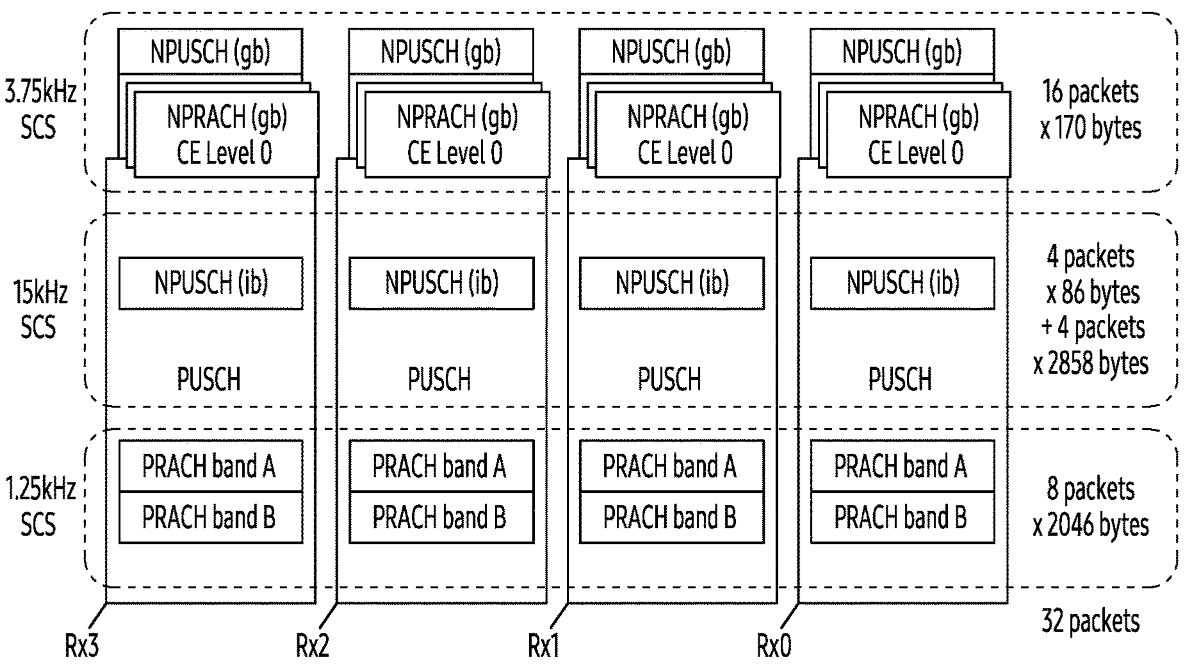

FIG. 5 illustrates user plane (U-plane) messages according to an embodiment of the disclosure.

The current FH (fronthaul) standard of O-RAN working group (WG) 4 does not allow transmission and reception of ORAN's U-plane payloads with a different eAxC ID through one packet (e.g., Ethernet-based eCPRI packet). For example, a CAT-A O-RU with four transmission/reception antennas is assigned a different eAxC ID for each antenna. When the downlink RB resource is allocated, the CAT-A O-RU may receive one U-plane packet for each transmission, in each symbol. In other words, the CAT-A O-RU may receive a total of four U-plane packets. When the uplink RB resource is allocated, the CAT-A O-RU may transmit a U-plane packet for each reception to the O-DU, in each symbol. For example, the CAT-A O-RU may transmit a total of four U-plane packets to the O-DU. Hereinafter, referring to FIG. 5, description will be made of an example of a U-plane packet between the DU and the RU in a situation where the uplink RB resource is allocated.

Referring to FIG. 5, an RU having four reception antennas may transmit uplink signals received through each reception antenna to a DU through a fronthaul interface. A physical resource block (PRB) index (idx) refers to an index of the PRB in the frequency domain. One PRB may include 12 resource elements (REs). The number of REs included in the PRB is the same irrespectively of the numerology. Here, the uplink signal refers to data received per unit time through the reception antenna.

In FIG. 5, the RU may receive an uplink signal through each reception antenna. The uplink signal may include a physical uplink shared channel (PUSCH) (or a physical uplink control channel (PUCCH)). For example, the subcarrier spacing (SCS) of the PUSCH may be 15 kHz (kilohertz). The uplink signal may include a physical random access channel (PRACH) in the frequency band A. For example, the SCS of PRACH in the band A may be 1.25 kHz. The uplink signal may simultaneously include the PRACH in the frequency band A and in another band B. For example, the SCS of PRACH in the band B may also be 1.25 kHz. The uplink signal may include an in-band type of narrowband physical uplink shared channel (NPUSCH) using a resource block of a frequency band (e.g., an LTE frequency band). For example, the SCS of the in-band type of NPUSCH may be 15 kHz. The uplink signal may include a guard-band type of narrowband physical uplink shared channel (NPUSCH) using a unused resource block in a guard-band of a frequency band (e.g., an LTE frequency band). For example, the SCS of the guard-band type of NPUSCH may be 3.75 kHz. The uplink signal may include a narrowband physical random access channel (NPRACH). The NPRACH may be distinguished according to a coverage extension (CE) level. The uplink signal may include NPRACH having a CE level of 0, NPRACH having a CE level of 1, and NPRACH having a CE level of 2. For example, the SCS of each NPRACH may be 3.75 kHz.

The RU may transmit information corresponding to four uplink signals to the DU. The RU may generate one or more U-plane messages based on the four uplink signals. The RU may transmit information corresponding to the four uplink signals to the DU, through one or more U-plane messages. In order to transmit information corresponding to the four uplink signals to the DU, the RU may use the fronthaul interface.

eAxC IDs may be assigned for fronthaul transmission between the DU and the RU. In an actually operated cell, the eAxC ID may be assigned for each antenna, each layer, or each channel type. Transmission and reception of a plurality of packets are required for transmission corresponding to one OFDM symbol. In NB (narrowband)-IoT (internet of everything) or multiple band PRACH operating cells, each band, NPUSCH (narrowband physical uplink shared channel), and NPRACH (narrowband PRACH) are distinguished by the eAxC ID. In FIG. 5, each square represents a section having a different eAxC ID. Accordingly, a total of eight channels are operated for each reception antenna. The number of packets required to transmit uplink signals shown in FIG. 5 to the DU is 32.

The increase in the number of packets transmitted and received per unit time significantly affects the processing load. If the load of packet processing in the DU or RU increases, a lot of hardware resources are required, so the cost of the corresponding product increases. In a virtualized DU, the number of cells that can be processed in a given HW resource is reduced.

Figure 6:
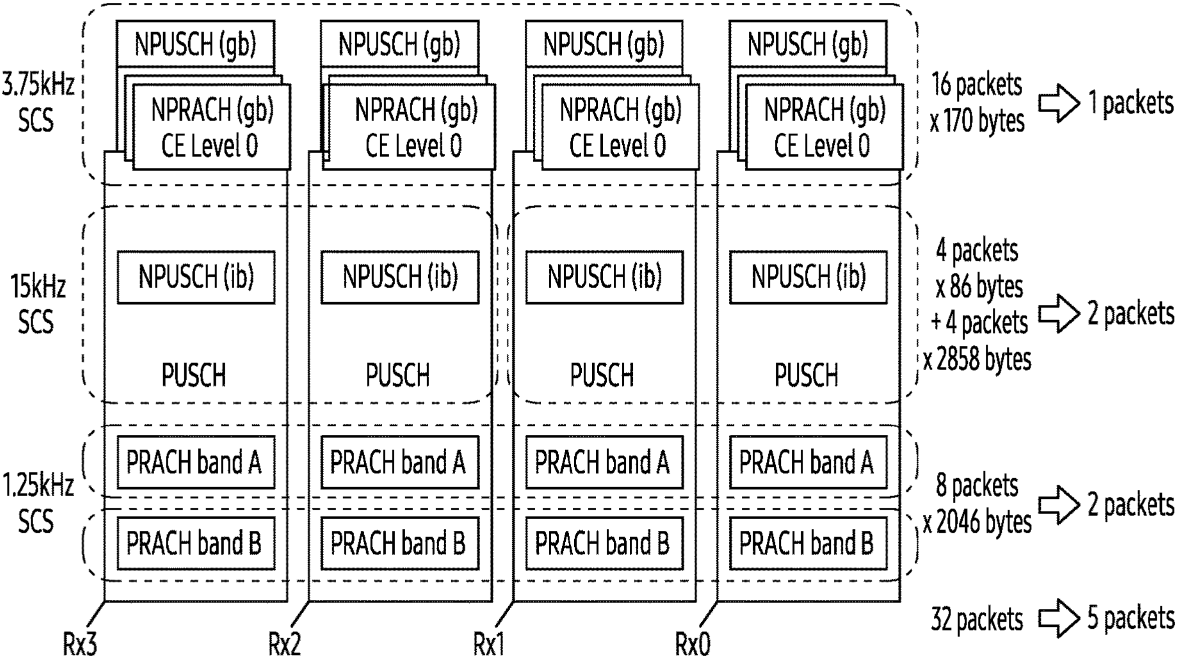
FIG. 6 illustrates a combination of user plane messages according to an embodiment of the disclosure.

FIG. 6 illustrates combining user plane messages according to an embodiment of the disclosure.

Referring to FIG. 6, a method for combining uplink signals shown in FIG. 5 into less than 32 packets is described. In FIG. 6, packet transmission using a jumbo frame is described as an example. The RU may generate an Ethernet packet so that the size of maximum transmission unit (MTU) does not exceed 9000 bytes. However, the jumbo frame is only of an example for describing embodiments of the disclosure and is not construed as limiting the embodiments of the disclosure thereto.

Referring to FIG. 6, since transmission/reception windows are different for each SCS, merging may be performed based on the same SCS. Specifically, the number of slots and the SCS in the subframe vary depending on the numerology, and thus, a slot number (e.g., slotId) (or SCS) for one U-plane message is generally defined. As such, the uplink packets transmitted through the fronthaul interface, that is, U-plane messages, may be distinguished according to the SCS.

In the example illustrated in FIG. 5, the number of packets required according to 15 kHz is 8. Further, the number of packets required according to 1.25 kHz is 8. Furthermore, the number of packets required according to 3.75 kHz is 16. In the current 3GPP standard, for example, the maximum transmittable capacity per unit time (e.g., per OFDM symbol) of PUSCH (or PUCCH) is 2,858 bytes. The maximum transmittable capacity per unit time of PRACH in a frequency domain having 1.25 kHz SCS is 2,046 bytes. Further, the maximum transmittable capacity per unit time of NPUSCH with a guard-band type of 3.75 kHz SCS is 170 bytes. Furthermore, the maximum transmittable capacity per unit time of an in-band type of NPUSCH with 15 kHz SCS is 86 bytes.

The RU may divide uplink data of each SCS based on 9000 bytes, so that the size of the MTU does not exceed that 9000 bytes. For example, the total size of data corresponding to 3.75 kHz of SCS is 2720 (=16×170) bytes. The data corresponding to 3.75 kHz of SCS may be carried by one packet having a size of 9000 bytes. For example, the total size of data corresponding to 15 kHz of SCS is 11776 (=4×86+4×2858) bytes. The data corresponding to 3.75 kHz of SCS may be carried by two packets. One packet may provide a maximum size of 9000 bytes. For example, the data corresponding to 5888 (=2×86+2×2858) bytes may be carried for each packet. For example, the total size of data corresponding to 1.25 kHz of SCS is 16368 (=8×2046) bytes. The data corresponding to 1.25 kHz of SCS may be carried by two packets. One packet may provide a maximum size of 9000 bytes. For example, the data corresponding to 8184 (=4*2046) bytes may be carried for each packet.

Comparing FIG. 5 and FIG. 6, the number of Ethernet packets transmitted through the fronthaul interface decreases from 32 to 5 in spite of transmitting information of the same size. Instead of transmitting data having different eAxC IDs in separate U-plane messages, respectively, the resource of the fronthaul interface can be saved by merging U-plane packets as shown in FIG. 6.

As described above, in order to reduce the load on message processing (hereinafter, referred to as 'message processing load') and secure sufficient resources for the fronthaul interface, the embodiments of the disclosure propose a method for merging U-plane data with different eAxC IDs into one packet. By merging the U-plane data with different eAxC IDs into a single packet, the number of packets in the fronthaul interface can be reduced. Meanwhile, in order to reduce the number of C-plane packets, a scheme to merge C-plane sections with different eAxC IDs into a single section has been proposed through the section confirmation information (e.g., Section Extension Type=10) in the O-RAN WG 4 standard. Therefore, in the disclosure, description will be made of section extension information for merging U-plane packets, and DU operations and RU operations related to the section extension information, which are different from the existing section extension information for merging C-plane packets.

Figure 7:
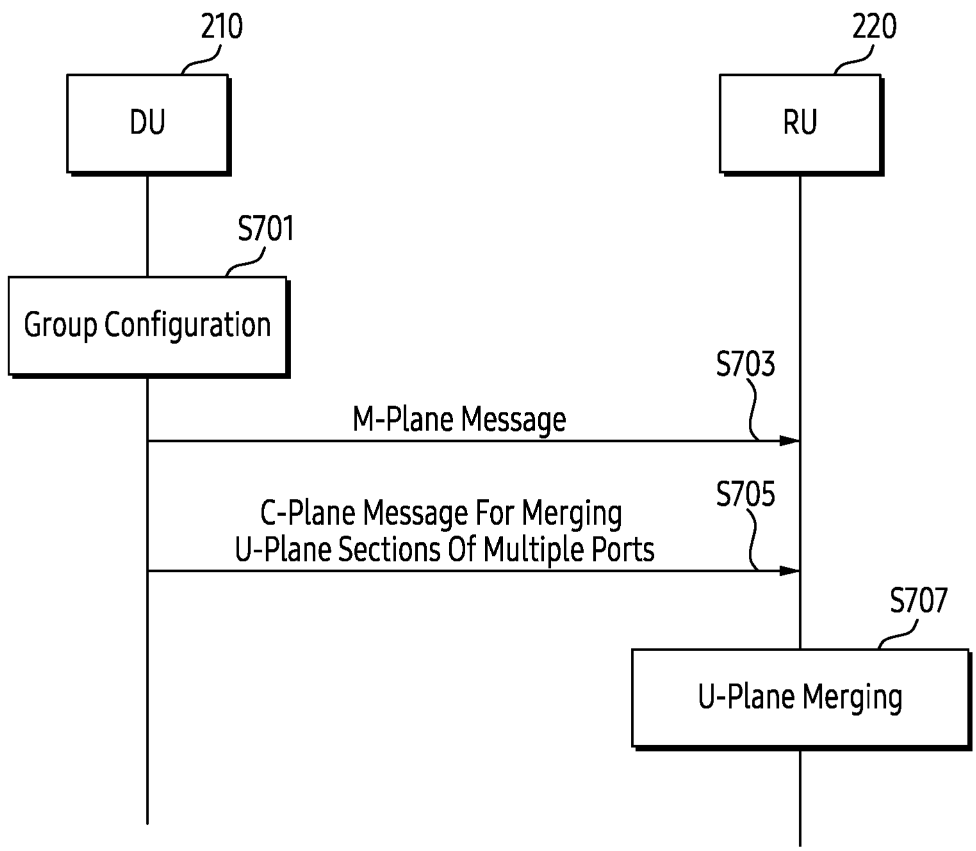
FIG. 7 illustrates signaling between a DU and an RU to combine user plane messages according to an embodiment of the disclosure.

FIG. 7 illustrates signaling between a DU and an RU to combine user plane (U-plane) messages according to an embodiment of the disclosure.

The DU illustrates the DU 210 of FIG. 2A. According to an embodiment of the disclosure, the DU 210 may include an O-DU 251. The RU illustrates the RU 220 of FIG. 2A. According to an embodiment of the disclosure, the RU 220 may include an O-RU 253.

Referring to FIG. 7, in operation S701, the DU may perform group configuration. The fronthaul interface between the DU and the RU may include a plurality of ports. For example, each port may correspond to a layer or a Tx/Rx path. According to an embodiment of the disclosure, each port may correspond to an eAxC ID. The group configuration may include a grouping operation of the eAxC ports. The group configuration may include designating a representative port of a group of eAxC ports. The group configuration may include designating a member port of a group of eAxC ports.

In operation S703, the DU may transmit a management plane (M-plane) message to the RU. The DU may generate the M-plane message based on the group configuration in operation S701. The M-plane message may include a result of group configuration in operation S701. The RU may receive the M-plane message from the DU. The RU may identify the group configuration based on the M-plane message.

According to an embodiment of the disclosure, the M-plane message may include port group information for transmission. The port group information for transmission may indicate a representative port of the group. The M-plane message may include information for indicating a representative port of the group. For example, the M-plane message may include information for indicating a representative eAxC port. The port group information for transmission may indicate one or more member ports of the group. The M-plane message may include information for indicating one or more member ports of the group. For example, the M-plane message may include information for indicating a member eAxC port.

According to an embodiment of the disclosure, the M-plane message may include port group information for reception. The port group information for reception may indicate a representative port of the group. The M-plane message may include information for indicating a representative port of the group. For example, the M-plane message may include information for indicating a representative eAxC port. The port group information for reception may indicate one or more member ports of the group. The M-plane message may include information for indicating one or more member ports of the group. For example, the M-plane message may include information for indicating a member eAxC port.

According to an embodiment of the disclosure, the M-plane message may include capability information related to the group. According to an embodiment of the disclosure, the M-plane message may include information for indicating the maximum number of groups for transmission. According to an embodiment of the disclosure, the M-plane message may include information for indicating the maximum number of ports per group for transmission. According to an embodiment of the disclosure, the M-plane message may include information for indicating the maximum number of groups for reception. According to an embodiment of the disclosure, the M-plane message may include information for indicating the maximum number of ports per group for reception.

The M-plane message may be configured, for example, as shown in the following Table 1.

TABLE 1

```
module: o-ran-uplane-conf
  rw user-plane-configuration
    rw low-level-tx-links* [name]
    rw low-level-rx-links* [name]
    ro endpoint-types* [id]
    rw transmission-window-schedules* [id]
{feat:STATIC-TRANSMISSION-WINDOW-CONTROL}?
    ro endpoint-capacity-sharing-groups* [id]
    ro endpoint-prach-group* [id]
    ro supported-compression-method-sets* [id]
    ro static-low-level-tx-endpoints* [name]
    ro static-low-level-rx-endpoints* [name]
    rw low-level-tx-endpoints* [name]
    rw low-level-rx-endpoints* [name]
    rw tx-array-carriers* [name]
    rw rx-array-carriers* [name]
    ro tx-arrays* [name]
    ro rx-arrays* [name]
    ro relations* [entity]
    rw eaxc-id-group-configuration {mcap:EAXC-ID-GROUP-SUPPORTED}?
        rw max-num-tx-eaxc-id-groups? -> /mcap:module-capability/ru-
capabilities/eaxcid-grouping-capabilities/max-num-tx-eaxc-id-groups
        rw max-num-tx-eaxc-ids-per-group? -> /mcap:module-capability/ru-
capabilities/eaxcid-grouping-capabilities/max-num-tx-eaxc-ids-per-group
        rw max-num-rx-eaxc-id-groups? -> /mcap:module-capability/ru-
capabilities/eaxcid-grouping-capabilities/max-num-rx-eaxc-id-groups
        rw max-num-rx-eaxc-ids-per-group? -> /mcap:module-capability/ru-
capabilities/eaxcid-grouping-capabilities/max-num-rx-eaxc-ids-per-group
        rw tx-eaxc-id-group* [representative-tx-eaxc-id]
                        rw representative-tx-eaxc-id uint16
                        rw member-tx-eaxc-id* uint16
        rw rx-eaxc-id-group* [representative-rx-eaxc-id]
                        rw representative-rx-eaxc-id uint16
                        rw member-rx-eaxc-id* uint16
    rw static-prach-configurations* [static-prach-config-id] {mcap:PRACH-
STATIC-CONFIGURATION-SUPPORTED}?
    rw static-srs-configurations* [static-srs-config-id] {mcap:SRS-STATIC-
CONFIGURATION-SUPPORTED}?
    rw configurable-tdd-patterns* [tdd-pattern-id] {mcap:CONFIGURABLE-
TDD-PATTERN-SUPPORTED}?
    rw general-config
```

'rw max-num-tx-exac-id-groups?' indicates the maximum number of groups for transmission. 'rw max-num-tx-exac-ids-per-groups?' indicates the maximum number of ports per group for transmission. 'rw max-num-rx-exac-id-groups?' indicates the maximum number of groups for reception. 'rw max-num-rx-exac-ids-per-groups?' indicates the maximum number of ports per group for reception. 'rwtx-exac-id group*[representative-tx-eaxc-id]' indicates port group information for transmission. 'rw presentative-tx-exac-id unit16' indicates eAxC ID pointing to the representative port of the port group for transmission. 'rw member-tx-exac-id*unit16' indicates the eAxC ID pointing to the member port of the port group for transmission. 'rwrx-exac-id group*[representative-rx-eaxc-id]' indicates port group information for reception. 'rw presentative-rx-exac-id unit16' indicates eAxC ID pointing to the representative port of the port group for reception. 'rw member-rx-exac-id*unit16' indicates eAxC ID pointing to the member port of the port group for reception. The M-plane message may include at least some of the components set forth in the Table 1.

In operation S705, the DU may transmit a C-plane message for merging user plane (U-plane) sections of a plurality of ports. The C-plane message may include section information. The section information, which is layer-specific information, may include information on resources allocated in one slot (e.g., 14 symbols). In the C-plane and the U-plane, the term 'section' may refer to an area to which resources are allocated. For example, one section may indicate a resource allocation area for N RBs in the frequency domain (e.g., N is 1 to 273, according to the current NR standard) and M symbols in the time domain. (e.g., M is 1 to 14 according to the current NR standard), in a resource grid represented as a time-frequency resource. In other words, the section information may include resource allocation information for communication between the RU and the terminal.

In some embodiments of the disclosure, the C-plane message may include beam information. The beam information, which is beam information for each section/or each layer, may indicate a beam pattern to be applied to U-plane data. The beam information, which is related to a scheme for pointing to a beam, may include parameters directly pointing to a weight vector (or a weight matrix according to embodiments) applied to form the beam, predefined weight vectors, or include an indicator (e.g., beam ID, a precoding indicator) indicating a resource to which a specific beam is applied. The beamforming may include digital beamforming, analog beamforming, or hybrid beamforming (i.e., digital beamforming and analog beamforming).

The C-plane message according to the embodiments of the disclosure may be used for merging user plane (U-plane) sections of multiple ports. The C-plane message may include information indicating to combine U-plane messages according to resource allocation, in addition to section information related to the resource allocation. Depending on the C-plane message, in order to reduce the number of U-plane packets transmitted or received, U-plane sections with different eAxC IDs may be merged into one U-plane section. For example, the section information on the multiple ports (i.e., layer or Tx/Rx path) may be the same, except for the beam ID or the UE ID. When two or more ports share common section information in the RU, the U-plane sections to be transmitted through each port may be merged into the U-plane section through a designated port.

According to an embodiment of the disclosure, the section extension information of the C-plane message may indicate a combination of U-plane messages. In order to transmit U-plane sections having different eAxC IDs through one packet, the section extension information may be added to a section protocol of the C-plane message including scheduling of the one packet. The section extension information may include type information, length information, and beam group type information, such as an extension field for merging the C-plane sections. The type information may indicate merging of the U-plane sections having different eAxC IDs. The length information indicates a length of the section extension information. The beam group type information indicates a scheduling scheme of beamId in the C-plane.

According to an embodiment of the disclosure, the number of section extension information of the C-plane message may be determined based on a section extension type (SET) 10 of the current O-RAN standard. For example, in order to load the U-plane sections with different eAxC IDs into a single packet, SET 74 may be added to the section protocol of the C-plane message. The type information may be configured with 7 bits. A bit string '100 1010', in which only one bit is changed in a bit string '000 1010' corresponding to the existing SET 10, may be used for merging the U-plane sections.

According to an embodiment of the disclosure, the processing operation of the SET 10 in the RU may be the same as the processing operation of the SET 74 in the RU. In other words, the section extension information according to the SET 74 may be the same as the section extension information according to SET 10, except for the type information. The change in the one bit may provide a small amount of overhead, without violating the O-RAN standard in terms of implementation. The change in the one bit may provide backward compatibility in terms of the standard, and the RU may perform a user plane merging with minimal operation. Although SET 74 has been described as an example for section extension information of a similar type with minimal bits, other examples may be used. As another example, the type information of the section extension information for merging the U-plane sections may indicate 42 corresponding to '010 1010'. As another example, the type information of the section extension information for merging the U-plane sections may indicate 26 corresponding to '001 1010'. The change in one bit indicates merging of the U-plane sections rather than merging of the C-plane sections. However, the number of the section extension information is an additional embodiment of the disclosure, and it goes without saying that a different number (e.g., SET 22) may be simply used.

In operation S707, the RU may perform a user plane merging. The RU may perform an operation for merging a plurality of U-plane sections into one U-plane section. The RU may generate one U-plane message by combining the U-plane messages. The one U-plane message may be referred to as an integrated U-plane message, a combined U-plane message, a merged U-plane message, or any term having an equivalent technical meaning thereto. The user plane merging of the RU will be described in more detail with reference to FIG. 8 to be described later.

In FIG. 7, the user plane merging in the uplink has been mainly described as an example, but the embodiments of the disclosure are not limited thereto. The user plane merging according to embodiments of the disclosure may be also applied to downlink packets. According to an embodiment of the disclosure, the DU may transmit a plurality of IQ sample data to the RU through one U-plane message. Each IQ sample data of a plurality of IQ sample data may correspond to one port, that is, an eAxC ID.

Although FIG. 7 illustrates that the DU performs the group configuration, the embodiments of the disclosure are not limited thereto. According to an embodiment of the disclosure, the group configuration of the DU may be manually set by an operator or obtained from another node.

In FIG. 7, an M-plane message for the group configuration has been described. According to an embodiment of the disclosure, the group configuration by the M-plane message may be used for merging of the C-plane sections and merging modes of the U-plane sections. That is to say, for the user plane merging in operation S707, additional configuration may not be defined in the M-plane. The RU may perform merging of the U-plane sections based on the group configuration used for merging the C-plane sections. The RU may perform merging of the U-plane sections according to the SET 74, based on the group configuration of eAxC IDs according to the SET 10. For example, the M-plane message may be referred to in Table 1. According to another embodiment of the disclosure, the M-plane message may independently include the group configuration for multiple ports in the C-plane and the group configuration for multiple ports in the U-plane.

Figure 8:
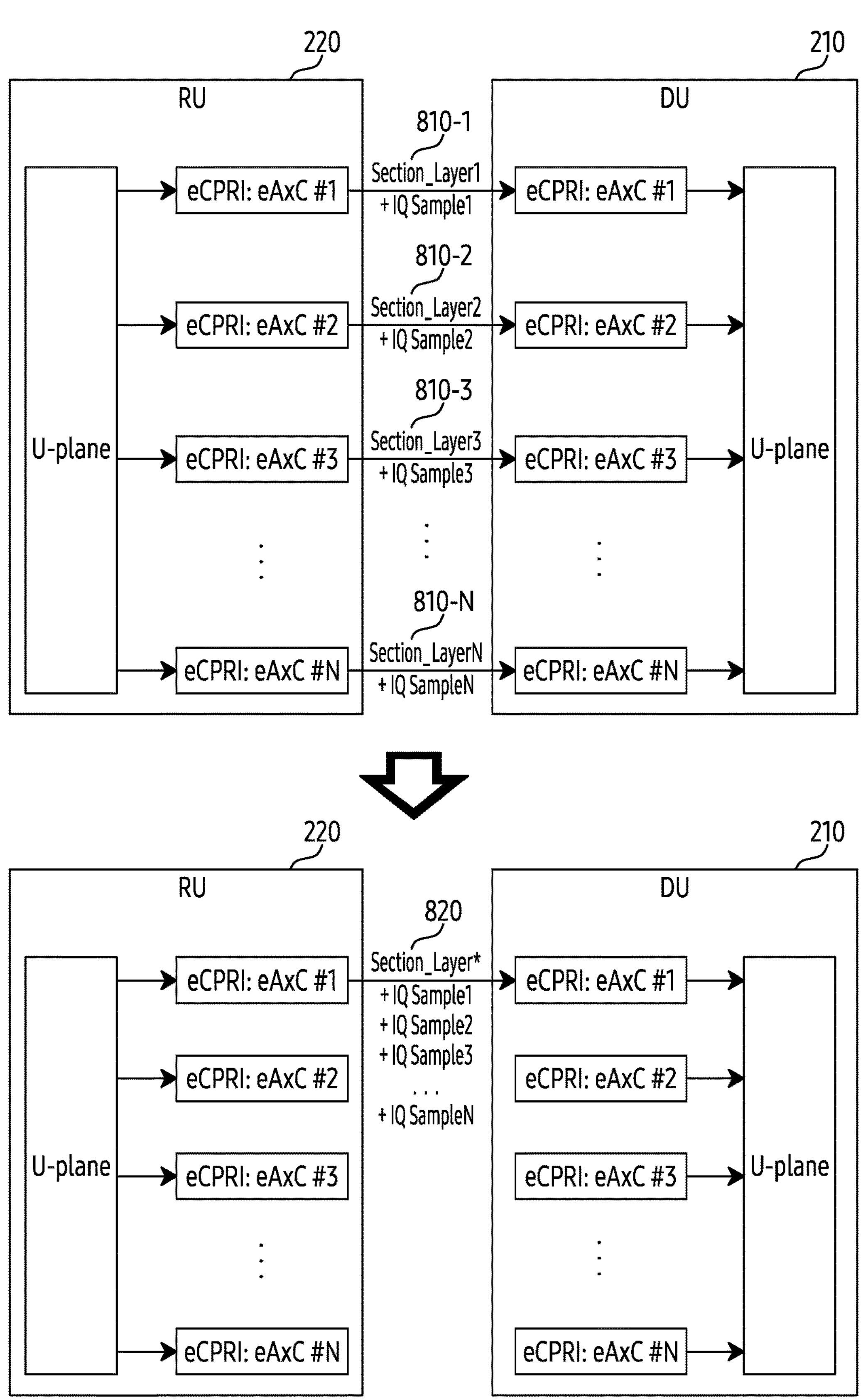
FIG. 8 illustrates transmission of a user plane message using a representative port according to an embodiment of the disclosure.

FIG. 8 illustrates transmission of a U-plane message using a representative port according to an embodiment of the disclosure.

In FIG. 8, description is made of a condition that one U-plane message in which uplink signals are merged is transmitted from the RU to the DU.

Referring to FIG. 8, the RU 220 may acquire uplink signals corresponding to a plurality of eAxCs. If the user plane merging According to embodiments of the disclosure is not performed, then the RU 220 may transmit a U-plane message for each eAxC ID to the DU 210. The processing unit (e.g., CPU of a C-plane) of the RU 220 may transmit the U-plane message to the DU 210 through the eAxC corresponding to each layer. The RU 220 may transmit a total of N U-plane messages to the DU 210. For example, the U-plane message corresponding to eAxC #1 may include IQ sample data #1. The U-plane message corresponding to eAxC #1 may be transmitted from the RU 220 to the DU 210 through a section layer #1 810-1. For example, the U-plane message corresponding to eAxC #2 may include IQ sample data #2. The U-plane message corresponding to eAxC #2 may be transmitted from the RU 220 to the DU 210 through a section layer #2 810-2. For example, the U-plane message corresponding to eAxC #3 may include IQ sample data #3. The U-plane message corresponding to eAxC #3 may be transmitted from the RU 220 to the DU 210 through a section layer #3 810-3. For example, the U-plane message corresponding to the eAxC #N may include IQ sample data #N. The U-plane message corresponding to eAxC #N may be transmitted from the RU 220 to the DU 210 through a section layer #N 810-N.

At least some of the U-plane messages transmitted through each layer may include the same payload. According to an embodiment of the disclosure, the U-plane messages transmitted in the same section (e.g., RB) may include the same section information. According to an embodiment of the disclosure, the U-plane messages having the same neurology may include the same section information. Therefore, if information sharing is possible for a plurality of eAxCs, reception of the same information of the RU 220 may act as an overhead due to its duplication. The RU 220 may perform the user plane merging according to embodiments of the disclosure. The RU 220 may combine N U-plane messages for a total of N layers. The RU 220 may generate one U-plane message by combining N U-plane messages. The RU 220 may identify a layer 820 for transmitting one U-plane message. The DU 210 may receive the one U-plane message through the layer 820.

In FIG. 8, description has been made of a situation in which the RU transmits one integrated U-plane message to the DU by combining the U-plane messages in the uplink, but the embodiments of the disclosure are not limited thereto. In the downlink, the DU may combine downlink traffic corresponding to eAxC IDs. The DU may generate one U-plane message including IQ sample data corresponding to each eAxC ID. The DU may transmit the one U-plane message to the RU.

FIG. 9 illustrates an example 900 of a control plane (C-plane) message for combining user plane (U-plane) messages according to an embodiment of the disclosure.

For example, the section type of the sections provided by the C-plane message may be 1, 3, or 5. Selected types of C-plane messages (e.g., section types 1, 3, and 5) may carry data section description conveying information applicable to data sections included in U-plane messages.

Referring to FIG. 9, the C-plane message may include transport header (e.g., eCPRI header or IEEE 1914.3) information, common header information 910, section information 920, and section extension information 930. The transport header may include 'ecpriVersion', 'ecpriReserved', 'ecpriConcatenation', 'ecpriMessage', 'ecpriPayload', 'ecpriRtcid/ecpriPcid', and 'ecpriSeqid' as aforementioned.

The common header information 910 may include 'dataDirection' indicating the data transmission direction of a base station (e.g., gNB), 'payloadVersion' indicating a valid payload protocol version of IEs in the application layer, and 'filterindex' meaning an index of for a channel filter between IQ data and air interface.

The common header information 910 may include information for indicating a location of time resource to which the message is applicable. The location of time resource may be indicated by a frame, a subframe, a slot, or a symbol. The common header information 910 may include 'frameId' indicating a frame number, 'subframeId' indicating a subframe number, 'slotId' indicating a slot number, and 'startSymblId' indicating a symbol number. The frame is determined based on 256-modulo operation. The subframe has a unit of 1 ms included in a frame of 10 ms. The slot number is numbered within the subframe, and its maximum size may be 1, 2, 4, 8, or 16 depending on the numerology.

The common header information 910 may include 'numberOfsections' indicating the number of data sections included in the C-plane message. The common header information 910 may include 'sectionType' for determining characteristics of U-plane data. The common header information 910 may include 'timeoffset' defining an offset from the beginning of a slot to the beginning of a cyclic prefix (CP), as the number of samples (e.g., Ts=1/30.72 MHz (megahertz), 'frameStructure' for indicating a frame structure defining FFT (fast Fourier transformation) size and SCS, and 'cpLength' defining a length of CP, as the number of samples (e.g., Ts=1/30.72 MHz (megahertz). According to an embodiment of the disclosure, 'sectionType' of the common header information 910 may indicate 1, 3, or 5. However, the section type indicating 1, 3, or 5 is only of an example, and it does not mean that the section extension type information 930 according to embodiments of the disclosure cannot be applied to other section types (e.g., 2, 4, 6, 7, . . . ).

The section information 920, which is layer-specific information, may include information on resources allocated in one slot (e.g., 14 symbols). In the C-plane and the U-plane, the term 'section' may mean an area to which resources are allocated. For example, one section may indicate a resource allocation area for N RBs in the frequency domain (e.g., Nis 1 to 273, according to the current NR standard) and M symbols in the time domain (e.g., M is 1 to 14, according to the current NR standard), in a resource grid represented as a time-frequency resource.

The section information 920 may include 'sectionId' meaning a section identifier. When C-plane and U-plane coupling through 'sectionId' is used, 'sectionId' identifies an individual data section described by the data section description within a C-plane message. 'sectionId' aims to map a U-plane data section to the corresponding C-plane message (and section type) associated with the data. The section information 920 may include 'rb' indicating whether every RB is used or every other RB is used, 'symInc' indicating a symbol number increment command, 'startPrbc' indicating a starting PRB number of the data section description, 'numPrbc' indicating the number of continuous PRBs for each data section description, 'reMask' defining a RE mask in the PRB, 'numSymbol' defining the number of physical random access channel (PRACH) repetitions or the number of symbols, to which the section control is applied, 'ef' indicating an extension flag, and 'beamId' defining a beam pattern to be applied to U-plane data.

The section extension information 930 may include 'extType' indicating an extension type that provides additional parameters. The section extension information 930 may include 'ef' indicating whether there is another extension or whether the current extension field is the last extension. The section extension information 930 may include 'extLen' providing a length of section extension in a unit of 32-bit (or 4-byte) words.

According to embodiments of the disclosure, 'extType' may indicate a user plane merging. For example, 'extType' may indicate a bit string of '100 1010'. The bit string '100 1010' may indicate 74 (=0x4A). As another example, 'extType' may indicate a bit string of '010 1010'. As still another example, 'extType' may indicate a bit string of '001 1010'.

According to embodiments of the disclosure, the section extension information 930 may further include control information for layers, for combining U-plane messages. For example, the section extension information 930 may be defined as shown in the following Table 2.

TABLE 2

| 0 | 1 | 2 | 3 | 4 | 5 | 6 | 7 | | |
|---|---|---|---|---|---|---|---|---|---|
| ef | | | extType | | | | | 1 | Octet N |
| | | extLen | | | | | | 1 | Octet N + 1 |
| beamGroupType | | | | numPortc | | | | 1 | Octet N + 2 |
| | | reserved | | | | | | 1 | Octet N + 3 |

According to an embodiment of the disclosure, the 'beam-Group Type' field may be added as a payload in the extension field. For example, the 'beamGroupType' field having 2-bit may be configured to indicate the scheduling scheme of the beamId in the C-plane message. The 'beam-GroupType' field may refer to 00b or 01b. The 'numPortc' filed may indicate the number of eAxC ports (or the number of layers or the number of transmission/reception paths) indicated by the extension field. The 'numPortc' filed may indicate the number of eAxC ports up to 64 ports according to the standard. 'reserved' field indicates reserved bits.

Although not shown in FIG. 9, according to another embodiment of the disclosure, the section extension information 930 may further include control information for individual layers. For example, the section extension information 930 may be defined as shown in the following Table 3.

TABLE 3

| 0 | 1 | 2 | 3 | 4 | 5 | 6 | 7 | | |
|---|---|---|---|---|---|---|---|---|---|
| ef | extType | | | | | | | 1 | Octet N |
| extLen | | | | | | | | 1 | Octet N + 1 |
| beamGroupType | | numPortc | | | | | | 1 | Octet N + 2 |
| reserved | 2st port beamID[14:8] (or euID[14:8]) | | | | | | | 1 | Octet N + 3 |
| 2st port beamID[7:0] (or ueID[7:0]) | | | | | | | | 1 | Octet N + 4 |
| reserved | 3nd port beamID[14:8] (or ueID[14:8]) | | | | | | | 1 | Octet N + 5 |
| 3nd port beamID[7:0] (or ueID[7:0]) | | | | | | | | 1 | Octet N + 6 |
| reserved | 1 | | | | | | | 1 | var |
| . . . | | | | | | | | 1 | var |
| reserved | (numPortc + 1)th port beamID[14:8] (or ueID[14:8]) | | | | | | | 1 | var |
| (numPortc + 1)th port beamID[7:0] (or ueID[7:0]) | | | | | | | | 1 | var |
| filler to ensure 4-byte boundary | | | | | | | | var | var |

In the meantime, the extension fields and the individual structures of Tables 2 to 4 are exemplary, and it would be obvious that any modification may be made in such a manner that it is obvious to those skilled in the art.

The transmission path (or reception path) of each layer may correspond to eAxC in eCPRI. The eAxC may refer to a data flow per antenna for each carrier in a sector. For example, the eAxC may be a unit of a spatially distinguishable signal flow. The RU may identify a representative eAxC for integrated U-plane message transmission. A representative eAxC for N eAxCs (N is an integer of 1 or more) may be set. According to an embodiment of the disclosure, the representative eAxC may be set according to the M-plane message of FIG. 7. The representative eAxC may be pre-designated to the DU and the RU through a service non-real-time OAM domain (ORAN M-plane) interface, and the DU may identify the eAxC designated in transmitting the control message, when transmitting multiple layer. According to another embodiment of the disclosure, the representative eAxC may be set according to a predetermined rule (e.g., a first eAxC). The RU according to the embodiments of the disclosure may generate a U-plane message to be transmitted through the identified path (e.g., the representative eAxC). The U-plane message may be an integrated message including IQ sample data for each of the N layers. By configuring the U-plane message to include section header information for plural layers rather than including section header information for a single layer, it is possible to reduce the overhead within the fronthaul interface.

The 'x-th port beamID' filed represents beam information for a separate layer. The 'beamID' of the 1st port may be included in the O-RAN header in the C-plane message.

The 'beamGroupType' field having 2-bit may be configured to indicate a beamforming scheme applied to the layers in the integrated U-plane message. For example, the 'beam-GroupType' field may be configured as shown in the following Table 4. The 'beamGroupType' field may indicate 11*b*.

TABLE 4

| beamGroupType | Scheduling Case | Description |
|---|---|---|
| 00b | Common beam | beamID in the section is used as a common beam ID for the 'numPortc' ports in front among the ports grouped by M-plane. In this case, extLen = 0 × 01. This type is not used for Section type 5 |
| 01b | Single User | The consecutive 'numPortc' beamIDs subsequent to the beamID in the section applies to the 'numPortc' ports. In this case, extLen = 0 × 01. This type is not used for Section type 5. The beamIDs comprising a beam matrix should be stored at RU. |
| 10b | Multi-User | beamID listed in the section extension applies to the 'numPortc' ports. BeamID. 'numPortc' beam ID or ueID should be included |
| 11b | N/A | reserved |

According to an embodiment of the disclosure, the C-plane message and related operations for the user plane merging of FIG. 9 may be performed based on the RU capability. In case where the RU capability indicates that the RU supports the section extension for the user plane merging, the DU may transmit to the RU a C-plane message including the section extension for the user plane merging. The DU and the RU may be used in conjunction with the 'representative eAxC' ID (M-plane configuration) to reduce the overhead with several U-plane messages to the overhead of sending a single U-plane message. For example, in the case of uplinks, the DU receives a single U-plane message from the RU, but it can perform an operation as if it had received four U-plane messages.

FIG. 10 illustrates a user plane (U-plane) message using a representative port according to an embodiment of the disclosure.

Through the C-plane message containing the section extension information (e.g., section extension information 930 in FIG. 9) for providing the user plane merging, the RU may load IQ sample data of the data sections into one U-plane packet. The data sections may correspond to grouped eAxC IDs in the eAxC ID group configuration. Since the data sections are specific to a value of the eAxC, different eAxC values may have differently defined data sections (e.g., including different ranges of PRBs). For example, each section type of the data sections may be 1, 3, or 5.

Referring to FIG. 10, a U-plane message 1000 according to the user plane merging may include a transmission header, an application layer header, and section header information 1010, and individual PRB information 1020, 1021, 1022, and 1023. A description of the transmission header and a description of the application layer header may be referred to in FIG. 9.

The section header information 1010 may include 'sectionId' meaning a section identifier, 'rb' indicating whether every RB is used or every other RB is used, 'symInc' indicating a symbol number increment command, 'startPrbu' indicating a starting PRB number of a U-plane section, and 'numPrbu' indicating the number of continuous PRBs for each data section. The values of parameters (e.g., rb, startPrbu and numPrbu) of the section header information 1010 ensure that the data sections never overlap. Only a single PRB may exist within one data section for a given eAxC. For the description of one section in the C-plane message, multiple U-plane data sections related to the section are required to define a PRB capable of applying IQ data included therein. In general, the data section within the U-plane may include PRBs corresponding to the section descriptions of the C-plane message.

The section header information 1010 may include 'udCompHdr' indicating a compression scheme and IQ bit width for user data of the data section. The compression scheme may include no compression, block floating point (BFP), block scaling, u-law, modulation compression, 'BFP and selective RE transmission', or 'modulation compression and selective RE transmission'. The section header information 1010 may include 'udCompLen' designating the total number of octets including padding, in PRB fields, up to the end of the current section. The compression scheme may be set by the M-plane or may be designated in 'udCompHdr' of the data section including the PRB. The section header information 1010 may include a 'reserved' field that is bits reserved for further use.

The RU may identify the representative eAxC ID and one or more member eAxC IDs, based on the group configuration of multiple ports. For example, the group configuration in FIG. 10 may be as set forth in the following Table 5. Meanwhile, although four eAxC ports are illustrated in FIG. 10, the number of ports for the user plane merging may vary according to a parameter (e.g., 'numPortc' of FIG. 9) of the C-plane message.

TABLE 5

| eAxC ID group configuration | | | |
|---|---|---|---|
| rx-eaxc-id-group #0 | [key = 0] | — | — |
| representative-t[r]x-eaxc-id | #0 | — | — |
| member-t[r]x-eaxc-id* | #1 | #2 | #3 |

The U-plane message may include PRB information. The PRB information may include IQ sample data for eAxC. For example, for IQ sample data for four eAxCs, the RU may generate four U-plane messages. The U-plane message for the first eAxC may include section header information 1010 and first PRB information 1020. The U-plane message for the second eAxC may include section header information 1010 and second PRB information 1021. The U-plane message for the third eAxC may include section header information 1010 and third PRB information 1022. The U-plane message for the fourth eAxC may include section header information 1010 and fourth PRB information 1023. However, transmitting the same section header information 1010 three additional times may lead to waste of the resources of the fronthaul interface.

According to embodiments of the disclosure, the RU may perform a user plane merging, in response to receiving a C-plane message including section extension information (e.g., section extension information 930 of FIG. 9) for providing the user plane merging. The RU may merge IQ sample data of sections having different eAxC IDs. According to an embodiment of the disclosure, if the header information of the section of a representative eAxC ID set by the M-plane is the same as the header information of the section of a member eAxC ID, then the RU may attach the IQ sample data corresponding to the member eAxC ID, subsequently to the IQ sample data corresponding to the representative eAxC ID.

The RU may add IQ sample data as many as 'numPortc' times in furtherance to the IQ sample data of the section header information 1010 and PRB information of the representative eAxC ID. The added IQ sample data may include iSample and qSample of each member eAxC ID. The RU may generate an integrated U-plane message in which each PRB information is sequentially added subsequently to the PRB information of the representative eAxC port, in order to reduce resource waste in the aforementioned fronthaul interface.

The first PRB information 1020 may include 'udCompParam' to indicate a parameter applied to a compression scheme used in a PRB corresponding to the representative eAxC port. The first PRB information 1020 may include iSample (in-phase sample) and qSample (quadrature sample) for each RE of the PRB corresponding to the representative eAxC port. The second PRB information 1021 may include 'udCompParam' to indicate a parameter applied to a compression scheme used in a PRB corresponding to the first member eAxC port (e.g., eAxC ID #1). The second PRB information 1021 may include iSample (in-phase sample) and qSample (quadrature sample) for each RE of the PRB corresponding to the first member eAxC port. The third PRB information 1022 may include 'udCompParam' to indicate a parameter applied to a compression scheme used in the PRB corresponding to the second member eAxC port (e.g., eAxC ID #2). The third PRB information 1022 may include iSample (in-phase sample) and qSample (quadrature sample) for each RE of the PRB corresponding to the second member eAxC port. The fourth PRB information 1023 may include 'udCompParam' to indicate a parameter applied to a compression scheme used in the PRB corresponding to the third member eAxC port (e.g., eAxC ID #3). The fourth PRB information 1023 may include iSample (in-phase sample) and qSample (quadrature sample) for each RE of the PRB corresponding to the third member eAxC port.

According to embodiments of the disclosure, the M-plane message may be used to set eAxC ID ports for a user plane combination. The group configuration of the M-plane message may include a representative eAxC ID and one or more member eAxC IDs for the user plane combination. According to an embodiment of the disclosure, the group configuration of the M-plane message may be used for both a combination of C-plane messages and a combination of U-plane messages. In other words, the group configuration of multiple ports for combing C-plane messages may be shared for merging U-plane messages. With a single group configuration, the combination of C-plane messages and the combination of U-plane messages may be performed. According to another embodiment of the disclosure, the group configuration of multiple ports for combining the U-plane messages may be set independently of the group configuration of multiple ports for combining the U-plane messages. For example, a representative eAxC ID for combining the U-plane messages and a representative eAxC ID for combining the C-plane messages may be different from each other.

According to embodiments of the disclosure, the C-plane message may include section extension information indicating a combination of U-plane messages. The section extension type indicator (e.g., 'extType' in FIG. 9) of the section extension information may indicate the combination of U-plane messages. According to an embodiment of the disclosure, the section extension information may indicate the combination of U-plane messages separately from the combination of C-plane messages. The RU may identify the combination of U-plane messages (e.g., in case of DL), or may perform the combination of U-plane messages (e.g., in case of UL). In this context, the combination of the C-plane messages may be configured by separate section extension information (e.g., SET=10). Alternatively, in this case, the C-plane messages may be transmitted from the DU to the RU, respectively, without combining the C-plane messages.

According to another embodiment of the disclosure, the section extension information may indicate a combination of U-plane messages together with a combination of C-plane messages. One section extension information may be used to set both the combination of C-plane messages and the combination of U-plane messages for the RU. Based on the one section extension information, the RU may receive one C-plane message combined with the C-plane sections and transmit one U-plane message combined with the U-plane sections to the DU. The parameters of the section extension information, such as 'extLen', 'numPortc', and 'beamGroupType', may be shared between the combination of C-plane messages (hereinafter, referred to as 'control plane merge') and the combination of U-plane messages (hereinafter, referred to as 'user plane merge').

According to another embodiment of the disclosure, the section extension information may indicate a combination of the U-plane messages through some reserved bits of the section extension information used to combine the C-plane messages. For example, the section type of the C-plane message may indicate '000 1010', and at least some of the 'reserved' bits (e.g., see Table 2 or Table 3) may indicate a combination of the U-plane messages. For example, a value of the 'reserved' bit at a designated position (e.g., the 'reserved' bit of Octet N+3) may indicate whether the U-plane messages are combined. For another example, a value of the 'reserved' bit included in the octet of a beam ID of each eAxC ID may indicate whether it is used for the user plane combination of the corresponding eAxC ID.

When a large number of the C-plane messages and the U-plane messages are required due to a large number of eAxC ID branches, such as in operation of CAT-A LTE NB-IoT Cell, it may lead to a problem that the amount of message processing load is not reduced enough to handle many cells. In particular, with only the C-plane message of SET=10 defined in the current standard, only the number of C-plane sections decreases, and thus, the amount of message processing load is still high. As such, the user plane merging according to the embodiments of the disclosure has proposed a method for reducing the number of the U-plane messages.

The user plane merging according to the embodiments of the disclosure makes it possible to reduce the load of message processing, by merging U-plane messages between different eAxC ports within a size limit of a C-plane message scheduling the data sections. In particular, it enables merging of NB-IoT cells or fragmented resources to increase the resource efficiency of the fronthaul interface, thereby securing the processing resources necessary for expanding the number of cells or performing other functions in the DU and the RU.

Using a combination of the corresponding U-plane messages in addition to a combination of C-plane messages of the related art, the load of message processing in a DU and a RU can be reduced significantly and rapidly. In the actual O-RAN cell operation, the effect of reduced message processing load according to the embodiments of the disclosure can be maximized in an environment with many fragmentation of eAxC IDs, sections, and messages, such as e.g., NB-IoT, enhanced machine type communication (eMTC), or mixed numerology.

According to embodiments of the disclosure, a method performed by a distributed unit (DU) comprises transmitting a management message including information for indicating a representative extended antenna-carrier (eAxC) port to a radio unit (RU) through a fronthaul interface. The method comprises transmitting a control plane message including section information and section extension information for resource allocation to the RU through the fronthaul interface. The section extension information may be used to combine a plurality of user plane (U-plane) messages into one U-plane message in the DU or the RU. The representative eAxC port of the fronthaul interface may be used for transmitting or receiving of the combined one U-plane message.

According to an embodiment of the disclosure, the section extension information includes type information for indicating merging of user plane data, beam group type information for indicating a type of beam grouping, and port information for indicating a total number of one or more eAxC ports. The one U-plane message includes downlink (DL) data or uplink (UL) data corresponding to the eAxC port and each eAxC port of the one or more eAxC ports.

According to an embodiment of the disclosure, for each eAxC port of a plurality of eAxC ports for the combining, the one U-plane message includes a user data compression parameter for indicating a compression scheme in a physical resource block (PRB), an in-phase sample (isample) value for each resource element (RE) of the PRB, and a quadrature sample (qsample) value for each resource element (RE) of the PRB.

According to an embodiment of the disclosure, the method further comprises receiving the one U-plane message from the RU, through the representative eAxC port of the fronthaul interface.

According to an embodiment of the disclosure, the section extension information and other section extension information may be used to combine a plurality of control plane (C-plane) messages into one C-plane message. The one C-plane message may be transmitted to the RU through the representative eAxC port of the fronthaul interface.

According to embodiments of the disclosure, a method performed by a radio unit (RU) comprises receiving a management message including information for indicating a representative extended antenna-carrier (eAxC) port from a distributed unit (DU) through a fronthaul interface. The method comprises receiving a control plane (C-plane) message including section information and section extension information for resource allocation from the DU through the fronthaul interface. The section extension information may be used to combine a plurality of user plane (U-plane) messages into one U-plane message in the DU or the RU. The representative eAxC port of the fronthaul interface may be used for transmitting or receiving of the combined one U-plane message.

According to an embodiment of the disclosure, the section extension information includes type information for indicating merging of user plane data, beam group type information for indicating a type of beam grouping, and port information for indicating a total number of one or more eAxC ports. The one U-plane message includes downlink (DL) data or uplink (UL) data corresponding to the eAxC port and each eAxC port of the one or more eAxC ports.

According to an embodiment of the disclosure, for each eAxC port of a plurality of eAxC ports for the combining, the one U-plane message includes a user data compression parameter for indicating a compression scheme in a physical resource block (PRB), an in-phase sample (isample) value for each resource element (RE) of the PRB, and a quadrature sample (qsample) value for each resource element (RE) of the PRB.

According to an embodiment of the disclosure, the method further comprises transmitting the one U-plane message to the DU through the representative eAxC port of the fronthaul interface.

According to an embodiment of the disclosure, the section extension information and other section extension information may be used to combine a plurality of control plane (C-plane) messages into one C-plane message. The one C-plane message may be received from the DU through the representative eAxC port of the fronthaul interface.

According to embodiments of the disclosure, an electronic device of a distributed unit (DU) comprises at least one transceiver, and at least one processor coupled to the at least one transceiver. The at least one processor is configured to control the at least one transceiver to transmit a management message including information for indicating a representative extended antenna-carrier (eAxC) port to a radio unit (RU) through a fronthaul interface. The at least one processor is configured to control the at least one transceiver to transmit a control plane message including section information and section extension information for resource allocation to the RU through the fronthaul interface. The section extension information may be used to combine a plurality of user plane (U-plane) messages into one U-plane message in the DU or the RU. The representative eAxC port of the fronthaul interface may be used for transmitting or receiving of the combined one U-plane message.

According to an embodiment of the disclosure, the section extension information includes type information for indicating merging of user plane data, beam group type information for indicating a type of beam grouping, and port information for indicating a total number of one or more eAxC ports. The one U-plane message includes downlink (DL) data or uplink (UL) data corresponding to the eAxC port and each eAxC port of the one or more eAxC ports.

According to an embodiment of the disclosure, for each eAxC port of a plurality of eAxC ports for the combining, the one U-plane message includes a user data compression parameter for indicating a compression scheme in a physical resource block (PRB), an in-phase sample (isample) value for each resource element (RE) of the PRB, and a quadrature sample (qsample) value for each resource element (RE) of the PRB.

According to an embodiment of the disclosure, the at least one processor is further configured to control the at least one transceiver to receive the one U-plane message from the RU, through the representative eAxC port of the fronthaul interface.

According to an embodiment of the disclosure, the section extension information and other section extension information may be used to combine a plurality of control plane (C-plane) messages into one C-plane message. The one C-plane message may be transmitted to the RU through the representative eAxC port of the fronthaul interface.

According to embodiments of the disclosure, an electronic device of a radio unit (RU) comprises at least one transceiver, and at least one processor coupled to the at least one transceiver. The at least one processor is configured to control the at least one transceiver to receive a management message including information for indicating a representative extended antenna-carrier (eAxC) port from a distributed unit (DU) through a fronthaul interface. The at least one processor is configured to control the at least one transceiver to receive a control plane message including section information and section extension information for resource allocation from the DU through the fronthaul interface. The section extension information may be used to combine a plurality of user plane (U-plane) messages into one U-plane message in the DU or the RU. The representative eAxC port of the fronthaul interface may be used for transmitting or receiving of the combined one U-plane message.

According to an embodiment of the disclosure, the section extension information includes type information for indicating merging of user plane data, beam group type information for indicating a type of beam grouping, and port information for indicating a total number of one or more eAxC ports. The one U-plane message includes downlink (DL) data or uplink (UL) data corresponding to the eAxC port and each eAxC port of the one or more eAxC ports.

According to an embodiment of the disclosure, for each eAxC port of a plurality of eAxC ports for the combining, the one U-plane message includes a user data compression parameter for indicating a compression scheme in a physical resource block (PRB), an in-phase sample (isample) value for each resource element (RE) of the PRB, and a quadrature sample (qsample) value for each resource element (RE) of the PRB.

According to an embodiment of the disclosure, the at least one processor is further configured to control the at least one transceiver to transmit the one U-plane message to the DU, through the representative eAxC port of the fronthaul interface.

According to an embodiment of the disclosure, the section extension information and other section extension information may be used to combine a plurality of control plane (C-plane) messages into one C-plane message. The one C-plane message may be received from the DU through the representative eAxC port of the fronthaul interface.

According to an embodiment of the disclosure, at least one non-transitory computer readable recording medium is provided. The at least one non-transitory computer readable recording medium includes instructions that cause at least one processor to transmit a management message including information for indicating a representative extended antenna-carrier (eAxC) port to a radio unit (RU) through a fronthaul interface, and transmit a control plane message including section information and section extension information for resource allocation to the RU through the fronthaul interface. The section extension information is used to combine a plurality of user plane (U-plane) messages into one U-plane message in the DU or the RU. The representative eAxC port of the fronthaul interface is used for transmitting or receiving of the combined one U-plane message.

According to an embodiment of the disclosure, at least one non-transitory computer readable recording medium is provided. The at least one non-transitory computer readable recording medium includes instructions that cause at least one processor to receive a management message including information for indicating a representative extended antenna-carrier (eAxC) port from a distributed unit (DU) through a fronthaul interface, and receive a control plane message including section information and section extension information for resource allocation from the DU through the fronthaul interface. The section extension information is used to combine a plurality of user plane (U-plane) messages into one U-plane message in the DU or the RU. The representative eAxC port of the fronthaul interface is used for transmitting or receiving of the combined one U-plane message.

The methods according to various embodiments described in the claims and/or the specification of the disclosure may be implemented in hardware, software, or a combination of hardware and software.

When implemented by software, a computer-readable storage medium storing one or more programs (software modules) may be provided. One or more programs stored in such a computer-readable storage medium are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective constituent memories may be provided in a multiple number.

Further, the program may be stored in an attachable storage device that can be accessed via a communication network, such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described specific embodiments of the disclosure, a component included therein may be expressed in a singular or plural form according to a proposed specific embodiment. However, such a singular or plural expression may be selected appropriately for the presented context for the convenience of description, and the disclosure is not limited to the singular form or the plural elements. Therefore, either an element expressed in the plural form may be formed of a singular element, or an element expressed in the singular form may be formed of plural elements.

Meanwhile, specific embodiments have been described in the detailed description of the disclosure, but it goes without saying that various modifications are possible without departing from the scope of the disclosure.

What is claimed is:

1. A method performed by a distributed unit (DU), the method comprising:

transmitting, to a radio unit (RU) through a fronthaul interface, a management plane (M-plane) message indicating a plurality of extended antenna-carrier (eAxC) ports that include a representative eAxC port;

transmitting, to the RU through the fronthaul interface, a control plane (C-plane) message including section information for resource allocation and section extension information that indicates the RU to combine uplink data of the plurality of eAxC ports into one user plane (U-plane) message; and receiving, from the RU through the fronthaul interface, the U-plane message of the representative eAxC port, that includes the uplink data of the plurality of eAxC ports, wherein the uplink data of the plurality of eAxC ports are associated with a same subcarrier spacing.

2. The method of claim 1, wherein the section extension information includes:

type information for indicating merging of user plane data, beam group type information for indicating a type of beam grouping, and port information for indicating a total number of one or more eAxC ports.

3. The method of claim 1, wherein, for each eAxC port of the plurality of eAxC ports for the combining, the U-plane message includes:

a user data compression parameter for indicating a compression scheme in a physical resource block (PRB);

an in-phase sample (isample) value for each resource element (RE) of the PRB; and a quadrature sample (qsample) value for each resource element (RE) of the PRB.

4. The method of claim 1, wherein the section extension information and other section extension information are used to combine a plurality of control plane (C-plane) messages into one C-plane message, and wherein the one C-plane message is transmitted to the RU through the representative eAxC port of the fronthaul interface.

5. A method performed by a radio unit (RU), the method comprising:

receiving, from a distributed unit (DU) through a fronthaul interface, a management plane (M-plane) message indicating a plurality of extended antenna-carrier (eAxC) ports that include a representative eAxC;

receiving, from the DU through the fronthaul interface, a control plane (C-plane) message including section information for resource allocation and section extension information that indicates the RU to combine uplink data of the plurality of eAxC ports into one user plane (U-plane) message; and transmitting, to the DU through the fronthaul interface, the U-plane message of the representative eAxC port, that includes the uplink data of the plurality of eAxC ports, uplink data of the plurality of eAxC ports are associated with a same subcarrier spacing.

6. The method of claim 5, wherein the section extension information includes:

type information for indicating merging of user plane data, beam group type information for indicating a type of beam grouping, and port information for indicating a total number of one or more eAxC ports.

7. The method of claim 5, wherein, for each eAxC port of the plurality of eAxC ports for the combining, the U-plane message includes:

a user data compression parameter for indicating a compression scheme in a physical resource block (PRB);

an in-phase sample (isample) value for each resource element (RE) of the PRB; and a quadrature sample (qsample) value for each resource element (RE) of the PRB.

8. The method of claim 5, wherein the section extension information and other section extension information are used to combine a plurality of control plane (C-plane) messages into one C-plane message, and wherein the one C-plane message is received from the DU through the representative eAxC port of the fronthaul interface.

9. A distributed unit (DU) comprising:

at least one transceiver; and at least one processor coupled to the at least one transceiver, wherein the at least one processor is configured to:

control the at least one transceiver to transmit, to a radio unit (RU) through a fronthaul interface, a management plane (M-plane) message indicating a plurality of extended antenna carrier (eAxC) ports that include a representative eAxC port, control the at least one transceiver to transmit, to the RU through the fronthaul interface, a control plane (C-plane) message including section information for resource allocation and section extension information that indicates the RU to combine uplink data of the plurality of eAxC ports into one user plane (U-plane) message, and control the at least one transceiver to receive, from the RU through the fronthaul interface, the U-plane message of the representative eAxC port, that includes the uplink data of the plurality of eAxC ports, and wherein the uplink data of the plurality of eAxC ports are associated with a same subcarrier spacing.

10. The DU of claim 9, wherein the section extension information includes:

type information for indicating merging of user plane data, beam group type information for indicating a type of beam grouping, and port information for indicating a total number of one or more eAxC ports.

11. The DU of claim 9, wherein, for each eAxC port of the plurality of eAxC ports for the combining, the one U-plane message includes:

a user data compression parameter for indicating a compression scheme in a physical resource block (PRB);

an in-phase sample (isample) value for each resource element (RE) of the PRB; and a quadrature sample (qsample) value for each resource element (RE) of the PRB.

12. The DU of claim 9, wherein the section extension information and other section extension information are used to combine a plurality of control plane (C-plane) messages into one C-plane message, and wherein the one C-plane message is transmitted to the RU through the representative eAxC port of the fronthaul interface.

13. A radio unit (RU) comprising:

at least one transceiver; and at least one processor coupled to the at least one transceiver, wherein the at least one processor is configured to:

control the at least one transceiver to receive, from a distributed unit (DU) through a fronthaul interface, a management plane (M-plane) message indicating a plurality of extended antenna-carrier (eAxC) ports that include a representative eAxC port, control the at least one transceiver to receive, from the DU through the fronthaul interface, a control plane (C-plane) message including section information for resource allocation and section extension information that indicates the RU to combine uplink data of the plurality of eAxC ports into one user plane (U-plane) message, and control the at least one transceiver to transmit, to the DU through the fronthaul interface, the U-plane message of the representative eAxC port, that includes the uplink data of the plurality of eAxC ports, and wherein the uplink data of the plurality of eAxC ports are associated with a same subcarrier spacing.

14. The electronic device-RU of claim 13, wherein the section extension information includes:

type information for indicating merging of user plane data, beam group type information for indicating a type of beam grouping, and port information for indicating a total number of one or more eAxC ports.

15. The RU of claim 13, wherein, for each eAxC port of the plurality of eAxC ports for the combining, the one U-plane message includes:

a user data compression parameter for indicating a compression scheme in a physical resource block (PRB);

an in-phase sample (isample) value for each resource element (RE) of the PRB; and a quadrature sample (qsample) value for each resource element (RE) of the PRB.

16. The RU of claim 13, wherein the section extension information and other section extension information are used to combine a plurality of control plane (C-plane) messages into one C-plane message, and wherein the one C-plane message is received from the DU through the representative eAxC port of the fronthaul interface.

* * * * *